(12) United States Patent
Zedan et al.

(10) Patent No.: US 10,821,817 B2
(45) Date of Patent: Nov. 3, 2020

(54) TORQUE OR POWER MONITOR

(71) Applicant: Punch Flybrid Limited, Northampton (GB)

(72) Inventors: Ernesto Zedan, Oxfordshire (GB); Ian Murphy, Oxfordshire (GB); Andrew Deakin, Oxfordshire (GB)

(73) Assignee: PUNCH FLYBRID LIMITED, Northampton (GB)

( * ) Notice: Subject to any disclaimer, the term of this patent is extended or adjusted under 35 U.S.C. 154(b) by 103 days.

(21) Appl. No.: 16/333,173

(22) PCT Filed: Sep. 6, 2017

(86) PCT No.: PCT/GB2017/052598
§ 371 (c)(1),
(2) Date: Mar. 13, 2019

(87) PCT Pub. No.: WO2018/051063
PCT Pub. Date: Mar. 22, 2018

(65) Prior Publication Data
US 2019/0232774 A1 Aug. 1, 2019

(30) Foreign Application Priority Data

Sep. 14, 2016 (GB) .................................. 1615663.0

(51) Int. Cl.
*B60K 6/10* (2006.01)
*B60L 50/30* (2019.01)
*B60W 50/00* (2006.01)

(52) U.S. Cl.
CPC ................ *B60K 6/10* (2013.01); *B60L 50/30* (2019.02); *B60W 2050/0008* (2013.01);
(Continued)

(58) Field of Classification Search
None
See application file for complete search history.

(56) References Cited

U.S. PATENT DOCUMENTS 5,999,864 A * 12/1999 Thiel ....................... B60L 50/30
701/22
8,142,329 B2 * 3/2012 Ortmann ............... B60W 10/02
477/39
(Continued)

FOREIGN PATENT DOCUMENTS

EP 162519 A1 11/1985
WO 2005015060 A1 2/2005
(Continued)

OTHER PUBLICATIONS

International Search Report for PCT/GB2017/052598; dated Feb. 8, 2018.

*Primary Examiner* — Dirk Wright
(74) *Attorney, Agent, or Firm* — Stetina Brunda Garred and Brucker; Mark B. Garred

(57) ABSTRACT

An energy storage and transmission system (ESRS) (69) comprises a transmission (9, 11) and an energy storage device such as a flywheel (1). While energy is being transferred between the energy storage device (1) and an energy source/sink (7), the transmission ratio of the transmission (9, 11) will usually be changing constantly. In order to manage the torque applied by the energy transfer device (1) or the power transferred, a controller (100) responds to discrepancy between the torque or power supplied and the torque or power demanded.

20 Claims, 8 Drawing Sheets

(52) U.S. Cl.
CPC ........... *B60W 2050/0019* (2013.01); *B60W 2050/0052* (2013.01); *B60W 2510/08* (2013.01); *B60W 2510/083* (2013.01); *B60W 2510/09* (2013.01); *B60W 2710/08* (2013.01); *B60W 2710/083* (2013.01); *B60W 2710/09* (2013.01); *Y02T 10/62* (2013.01)

(56) References Cited

U.S. PATENT DOCUMENTS

| | | | |
|---|---|---|---|
| 9,718,343 B2* | 8/2017 | Atkins | ............ H02K 7/025 |
| 2013/0238213 A1* | 9/2013 | Jensen | ............ G01M 13/04 |
| | | | 701/99 |
| 2015/0291059 A1 | 10/2015 | Kawasaki | |

FOREIGN PATENT DOCUMENTS

| | | |
|---|---|---|
| WO | 2012143689 A1 | 10/2012 |
| WO | 2014158888 A1 | 10/2014 |

* cited by examiner

TORQUE OR POWER MONITOR

CROSS-REFERENCE TO RELATED APPLICATIONS

The present application claims priority to International Patent Application No. PCT/GB2017/052598 filed Sep. 6, 2017, which claims priority to Great Britain Application No. 1615663.0 filed Sep. 14, 2016, the disclosures of which are incorporated herein by reference.

STATEMENT RE: FEDERALLY SPONSORED RESEARCH/DEVELOPMENT

Not Applicable

BACKGROUND

1. Technical Field

The present invention relates to methods of managing energy storage and recovery systems (ESRSs) such as those used on board vehicles (for example, flywheel systems), capable of supplying torque to an energy source/sink. Embodiments of the present invention relate to methods of managing ESRSs for vehicles by monitoring the torque (directly or indirectly, i.e. via one or more variables representative of it) transmitted between an energy source, such as a flywheel, and the energy source/sink, such as a vehicle drivetrain, or other system pertaining to the vehicle. The present invention also relates to controllers for performing said methods; to apparatus comprising said controllers; and, to computer programmes for implementing such methods. The present invention also relates to a vehicle that may use said methods.

2. Description of the Related Art

An energy storage and recovery system (ESRS) allows surplus energy in a machine to be stored, and subsequently to be used to drive, or help to drive, the machine. This improves the overall efficiency of the machine. Examples are the storage of energy that would otherwise be dissipated through braking when a vehicle is required to slow down, and the storage of energy returned to a drive mechanism when a heavy component, such as a hydraulic arm, is required to be lowered. In principle, an ESRS can use any form of energy storage device that is capable of receiving energy in the form of motion (usually, in the form of rotation) and storing the energy, and is capable, subsequently, of returning some of the stored energy in the form of motion, again, normally, in the form of rotation. Various systems comprising flywheels as the energy storage device are used as energy storage and recovery systems.

In the case of vehicle-based energy storage and recovery systems, energy is typically transmitted by imparting torque to various rotary elements that form a transmission which operably connects, for example, the flywheel, on one side, to the wheels of the vehicle on the other side (the vehicle side). Energy can be regarded as being transferred with positive sign when it is transferred from the ESRS to the energy source/sink. The flywheel can operate as a primary mover (i.e. as an energy source) for the vehicle. When the flywheel progressively slows down, it transfers energy via the transmission to the vehicle drivetrain, which acts as an energy sink. In this mode of operation, positive torque is transmitted through the transmission. The flywheel, conversely, can operate as an energy storage device. When the flywheel progressively speeds up storing energy, the energy is transferred to the flywheel, via the transmission, from the vehicle drivetrain or other energy source. In this mode of operation, negative torque is transmitted through the transmission, i.e. the torque is transmitted from the vehicle drivetrain to the flywheel.

In order to enable an efficient use of the energy storage and recovery system, it is preferable to include, in the transmission, between the energy storage device and the energy source/sink (the mechanism from which energy is received and to which energy is delivered), some means for varying the transmission ratio so that the system as a whole can accommodate a large range of speed differences between the energy storage device and the energy source/sink. Additionally, it will normally be desired for the relative speed of movement of the energy storage device and the energy source/sink to change substantially continuously. Since, as noted above, the transfer of energy will normally imply that the speed of rotation of the flywheel increases as the speed of rotation of the vehicle transmission decreases (storage of braking energy) or vice versa (acceleration of the vehicle, using stored energy), the transmission ratio between the energy storage device and the energy source/sink must change continuously in order to allow energy to be transmitted in the desired manner. Co-pending patent application GB 1504232.8 discloses a transmission for an energy storage device, and its contents are incorporated herein by reference.

It is known to provide an energy storage and recovery system with a continuously variable transmission such as a belt drive with means to vary the drive radius of a pulley for the belt or, alternatively, with a toroidal continuously variable transmission such as is described in WO 2009/030948.

US 2011/0071000 A1 proposes a system in which a flywheel transmits positive torque (to deliver energy) or negative torque (to store energy) to the wheels of a vehicle through a clutch, and a continuously variable transmission is located in a drive path between the clutch and the vehicle wheels. The system determines the amount of torque to be applied by the flywheel (torque demand), and this is used to calculate the torque to be transmitted by the clutch. This is in turn used to calculate the pressure to be applied to the clutch.

Various other transmission arrangements can be coupled to the energy storage devices of the ESRSs. Some transmissions comprise multiple torque transfer paths, which can be selected manually, semi-automatically or automatically. Many transmission components such as belt drives, toroidal variators and/or clutches are operated by one or more actuators. These actuators, and in particular any mechanical or hydraulic components associated with them, such as valves, pistons, pumps and seals may, as any other hydraulic or, more generally, mechanical components, be subject to ageing and/or failure. This may result into transfer of inaccurate and/or unwanted torque through the transmission.

GB 2517523 A discloses a flywheel control scheme. The kinetic energy that the flywheel assembly can store is limited by the mechanical strength of the flywheel assembly. It is therefore important that the flywheel assembly be safe, for example in the case of breakage, to prevent catastrophic failure. The flywheel is controlled so as to prevent flywheel acceleration if any of a plurality of sensors that measure the rotation of the flywheel detects an anomaly.

BRIEF SUMMARY

Aspects and optional features of the present invention are set out in the accompanying claims and hereinbelow:

According to an aspect of the present disclosure, there is provided a controller for managing an energy storage and recovery system capable of exchanging torque with an energy source/sink. The controller is arranged to perform a torque monitoring function. The controller may be arranged to receive a first input representative of a torque demanded to the energy storage and recovery system. The controller may be arranged to receive a second input representative of a torque supplied by the energy storage and recovery system. The second input may alternatively be such that a signal representative of the torque supplied may be derived from the second input by the controller itself. The controller may control or manage the torque supplied by the energy storage and recovery system to the energy source/sink in response to discrepancy between the torque demanded and the torque supplied. In doing so, the controller may be arranged or programmed to reduce or eliminate the discrepancy between the torque demanded and the torque supplied. The controller may be arranged or programmed to output at least one signal for managing said torque supplied.

Embodiments of the present invention, therefore, may help in maintaining an alignment between the torque demanded to the energy storage and recovery system and the actual torque being delivered by it, i.e. the torque supplied. These or other embodiments of the present invention may cause the ESRS to enter a safe state in response to said discrepancy. This may be a preferable action in cases where an undesirable response of the system has been detected which is deemed to constitute an unrecoverable situation of error, for example where a component of the ESRS, or its transmission, has suffered a terminal failure.

Furthermore, at least preferred embodiments of the present invention may enable a failure tolerant, active safety mechanism to be implemented. The torque demanded to the energy storage and recovery system may be null and the vehicle may be at a stop. If, for any reasons (comprising possible failures or malfunctioning of any of the mechanical or electronic components that enable the torque to be transmitted, for example plate wear or control valve degradation or seizure), the corresponding torque delivered by the energy storage and recovery system is not equal to zero, there is a possibility that this unwanted torque may reach the wheels and one or more remedial actions may be undertaken by the controller to prevent this. The torque demanded to the energy storage and recovery system may not be null (i.e. it may be a positive or negative value) when such unwanted torque is detected and the controller causes the ESRS to enter a safe state.

The controller may be programmed to evaluate the discrepancy between the torque demand and supply.

The ESRS may comprise a flywheel and a transmission associated with the flywheel.

The first input may be representative of a torque demanded referred to the flywheel. Referring the torque demanded to the flywheel may comprise adjusting the torque demanded by accounting for one or more torque transmission ratios, any losses in the transmission and/or any coastdown losses in the flywheel.

A demanded flywheel rotation parameter (such as flywheel speed, rate of change of flywheel speed or flywheel acceleration) can be calculated by the controller by knowing the flywheel momentum of inertia (this information may for example be stored in a memory associated with the controller, such as an internal memory of the controller) and the torque demanded referred to the flywheel.

A signal representative of a corresponding, measured flywheel rotation parameter may be received by the controller as the second input. The controller may be programmed to compare the demanded flywheel rotation parameter with the measured flywheel rotation parameter, thus evaluating the discrepancy.

In preferred embodiments, the controller is programmed to calculate an error parameter associated with said discrepancy. This is to enable the controller to elaborate logics or algorithms for managing the torque supplied. It may not always be appropriate to take action following the detection of a discrepancy by the controller. Preferably, the controller manages the torque supplied by the ESRS if an error condition associated with said error parameter is satisfied. This error condition may be, for example, that a certain threshold has been overcome, or that said threshold has not only been overcome but it has been overcome for a sustained time interval. The controller may be programmed to reset the error parameter, or cause the error parameter to decay, after a predetermined time interval, to zero or other predetermined value, as considered appropriate in specific implementations.

From a computational standpoint, there may be many suitable ways of calculating the error parameter. For example, the calculation of the error parameter may be or may at least comprise the calculation of a difference between the torque demanded and the torque supplied, or a difference between the demanded and measured flywheel rotation parameters, and/or a ratio between the torque demanded and the torque supplied, or a ratio between the demanded and measured flywheel rotation parameters—either or both of these functions being generally suitable for an appropriate quantification of the discrepancy between the torques on the demand and supply sides. In these or other embodiments, the error parameter may comprise an accumulation of instantaneous discrepancies detected by the controller. The error parameter may also be determined from two or more discrepancies between the torque demand and supply. For example, it may be a sum of two or more instantaneous discrepancies between the torque demanded and the torque supplied. In preferred embodiments, the error parameter is calculated according to a "leaky bucket" logic, in which the error parameter is allowed to decay with time such that the error parameter serves as a measure of the rate of accumulation of discrepancy relative to the rate of decay of the error parameter. This method may help to avoid false requirement for the controller to intervene (i.e. manage the torque supplied) since this method may filter out transient discrepancies. This method may thus impose that the controller require consistent and/or persistent and/or sufficiently large discrepancy to intervene.

If the error condition is met by the error parameter, the controller may manage the energy storage and recovery system, and the controller may then be programmed to reset the error parameter. If the error condition has not yet been met, the controller may nevertheless be programmed to reset the error parameter, optionally if one or more other error criteria are satisfied, so that only persistent discrepancy between the torque demand and the torque supply may trigger any actions of the controller.

The resetting or decaying of the error parameter may be performed gradually, over time. For example, the controller may be programmed to attenuate the error parameter as a function of time. Said attenuation may be of a fixed or variable amount after each predetermined time interval. The predetermined time interval may optionally be constant, or time-dependent. The error parameter may decay as a first order decay function. The error parameter may alternatively decay such that it is made to halve after a predetermined time period named "half-life". Any of these methods may help to avoid 'false calls', i.e. events when the controller unnecessarily intervenes.

Similarly, the controller may be programmed to respond if one or more of a set of first conditions relating to the first input and/or one or more of a set of second conditions relating to the second input (or signal from which the controller may derive the second input) are satisfied. For example, in preferred embodiments, the controller may be prevented from responding if the first input (i.e. the one representative of the torque demanded) is below a certain threshold. If action is not warranted, the controller may be programmed to reset or cause to decay the error parameter. The controller may be programmed to then enter or re-enter an initial mode. In the initial mode, the controller may start or re-start to receive the inputs so that any discrepancy between the demanded and supplied torques can be evaluated or re-evaluated, and, if required, responded to by managing the torque supplied by the ESRS.

In some embodiments, the controller may adopt a feed-back control strategy. As such, the controller may be arranged to receive one or more further feed-back inputs directly representative of the controlled variable, i.e. the discrepancy between the torque demanded and the torque supplied.

In alternative embodiments, the controller may be programmed to calibrate the torque supplied by the energy storage and recovery system to the torque demanded across a range of torque demands. In these embodiments, the controller is programmed to implement an open-loop or feed-forward calibration of the torque supplied against the torque demanded.

Open-loop or feed-forward torque calibration may be useful, for example in vehicles, in response to ageing of components that transmit or cooperate to transmit torque between the energy storage and recovery system and the energy source/sink, such as clutches, valves, pistons, shafts, mechanical joints, variators, etc., which in time may respond differently than originally predicted in response to the forces acting on them, or which may respond differently than predicted due to unexpected manufacturing tolerances.

In preferred embodiments, the torque demand and torque supply are referred to the same location or component, such as at the flywheel or at the vehicle side of the transmission. The transmission, however, may be for transmitting torque to the wheel of the vehicle, or to a vehicle accessory such as an excavator boom.

Energy or power dissipated between the point of torque measurement and the energy recovery and storage system, or between the point of torque measurement and the vehicle side of the transmission (this will depend on the location at which the torque supply and demand may be referred) may be taken into account. Accordingly, the controller may be adapted to receive data representative of a torque transmission energy efficiency coefficient that relates the energy, power or torque being transmitted at said location of torque measurement with the energy, power or torque being supplied at the energy storage device or at the vehicle side of the transmission. The controller may be arranged to be responsive to said data.

According to a further aspect of the present invention, there is provided a controller as described herein in combination with a sensor for sensing an energy level in the energy storage and recovery system, wherein the sensor is arranged to send a signal representative of said energy level to the controller, and the controller is programmed to calculate the second input from said signal.

In preferred embodiments, the energy storage and recovery system comprises a flywheel and the sensor is for sensing the flywheel rotation. The controller may be programmed to calculate the second input from the sensed flywheel rotation.

In alternative embodiments, the controller may calculate a demanded flywheel rotational speed or a demanded flywheel energy level, and the sensed flywheel rotational speed or energy level associated with it may be compared with the demanded flywheel rotational speed or energy level.

The controller may be arranged to receive data representative of a transfer function that relates the torque demand to the demanded flywheel rotational speed or energy level, and the controller may be arranged to respond to said transfer function.

The flywheel rotation sensor may be a speed sensor, such as an encoder, or an acceleration sensor, such as an accelerometer. Various signal conditioning accessories may be coupled with the sensor, such as filters, gates, amplifiers, as required. Further, the speed may be sampled by the sensors according to different sampling rates. Embodiments of the present invention sample the flywheel speed every 1 millisecond. However, different sampling rates are possible, depending on the application.

In converting the demanded torque into the demanded flywheel rotational speed or energy, or flywheel acceleration, it may advantageous to account for energy dissipation in the flywheel transmission. This may be the case when the demanded torque is referred to the vehicle side of the transmission, while the demanded flywheel rotational speed or energy, or the flywheel acceleration, is (by definition) referred to the flywheel, or vice versa. A transfer function may be introduced to do this. The transfer function may be stored in a memory associated with the controller. The transfer function may comprise a ratio of the demanded torque referred to the flywheel divided by the flywheel momentum of inertia. From this the demanded flywheel acceleration may be determined, or the demanded rotational speed or energy of the flywheel may be determined (for example by integrating the demanded flywheel acceleration). When referring the torque demanded to the flywheel, the transfer function may depend on relevant ratios of the transmission, and/or power losses in the transmission may be taken into account in the transfer function. Furthermore, accelerations of intermediate elements of the transmission which may increase or reduce the demanded torque referred to the flywheel may also affect the transfer function. For example, in the case of a clutched flywheel transmission in which two clutches act in series with an intermediate inertia between them, in determining the demanded flywheel rotational speed or energy, or demanded flywheel acceleration, flywheel rotational losses may be taken into account in the transfer function, for example by subtracting a flywheel coast-down torque from the demanded torque referred to the flywheel.

When the controller estimates the demanded flywheel speed from the required torque signal, the estimated flywheel speed, over a medium to long period of time (that may be longer than the period of time over which the discrepancy is being assessed by the controller), may be corrected such that it tallies with measured flywheel speed over this longer timeframe. This may cause transient discrepancies to give rise to intervention by the controller, but may ensures that the estimated flywheel speed signal in the controller is not allowed to drift over a long period of time. This may be achieved by (i) passing the measured flywheel speed or rotation signal through a low-pass filter to create a first signal, (ii) passing the estimated flywheel speed or rotation signal through a high-pass filter to create a second signal, and then creating a third signal from a sum or difference of the first two signals. The third signal may serve to calculate the error parameter that is indicative of, in this case, an energy discrepancy, this indicating that actionable discrepancy between demanded and delivered torque has occurred. The cut-off frequency of the low-pass filter may be 0.05 to 0.5 Hz, whilst the cut-off frequency of the high-pass filter may be 1 to 10 Hz.

According to a further aspect of the present disclosure, there is provided apparatus for managing an energy storage and recovery system comprising a controller as described herein and/or a controller in combination with a sensor as described herein.

The apparatus may comprise the energy storage and recovery system, which may optionally comprise one or more flywheels. The apparatus may further comprise the transmission that transmits torque between the flywheel or other energy storage device and the vehicle or other accessory (i.e. the energy source/sink).

The transmission may comprise a continuously variable transmission component. The continuously variable transmission component may optionally be a variator. The variator may optionally be a toroidal variator. The transmission may optionally be clutched, such as a clutched flywheel transmission.

The apparatus may further comprise the energy source/sink, wherein the energy source/sink may optionally comprises a vehicle drivetrain, one or more vehicle wheels, and/or, one or more torque-operable vehicle accessories such as an excavator boom.

The apparatus may comprise one or more vehicle electronic control units arranged to form the controller. The vehicle control units may be programmable and may be arranged to communicate over a network, such as is known in the arts.

In preferred embodiments, the controller implements a safety control strategy and the apparatus may therefore comprise a safety system for disabling transmission of torque from the energy storage and recovery system to the energy source/sink. The controller may be arranged to output at least one signal for activating said safety system. Said safety system may comprises at least one clutch for connecting or disconnecting a torque path and/or a safety brake. This clutch may be a clutch of the transmission, or a dedicated clutch.

According to a further aspect of the present disclosure, there is provided a vehicle comprising a controller as described herein, or comprising an apparatus as described herein.

According to a further aspect of the present disclosure, there is provided a method of managing an energy storage and recovery system capable of exchanging torque with an energy source/sink, the method comprising receiving a first input representative of a torque demanded to the energy storage and recovery system. The method may further comprise receiving a second input representative of a torque supplied by the energy storage and recovery system (or receiving a signal from which said second input can be derived). The method may further comprise managing the torque supplied by the energy storage and recovery system to the energy source/sink in response to discrepancy between the torque demanded and the torque supplied. In preferred embodiments, the torque supplied may be managed by the controller to reduce or eliminate the discrepancy between the torque demanded and the torque supplied. The controller may be arranged or programmed to output at least one signal for managing the torque supplied. In these or other embodiments, the output signal generated by the controller may cause the ESRS to enter a safe state as described herein, for example by disconnecting a clutch.

Managing the torque supplied by the energy storage and recovery system to the energy source/sink may comprise calibrating the torque supplied by the energy storage and recovery system to the torque demanded across a range of torque demands. The method may further comprise updating a calibration software; and/or compiling or updating a calibration table, such as a look-up table. The calibration table may comprise one or more calibration coefficients and/or calibration functions, and the method may therefore require calculating and/or updating the one or more calibration coefficients and/or functions. The calibration software and/or the calibration table may be internal or external with respect to the controller. Preferably, however, the calibration software and/or the calibration table reside in a memory located in the controller. The calibration software and/or calibration table may relate the demanded torque to a current request, voltage request or pulse width modulation (PWM) request on a pressure control valve which controls a clutch actuation pressure. However, the skilled person will appreciate that such a relationship may extend to the torque demand and other calibration parameters via the above or different calibration coefficients or functions. When the discrepancy is detected, in embodiments the controller may determine whether adaptation (or updating) of the calibration coefficients or functions is appropriate. For example, the controller may require that the discrepancy be detected close to or at steady state vehicle speed or vehicle output torque conditions before adapting (or updating) any calibration coefficients or functions. The controller may be programmed to determine whether the above (or other) vehicle operating conditions are suitable for performing said calibration. If the vehicle operating conditions are suitable, the controller may be programmed such that the discrepancy may cause a suitable calibration coefficient to be incremented, or decremented. For example, if the supplied torque is lower than the demanded torque, then the relationship between a control valve current and the demanded torque in the controller's software may be altered permanently such that a given torque demand provided increased current to the controller valve which, in turn, provides increased pressure to a relevant torque generation device (such as a clutch), thus reducing or eliminating the discrepancy between demanded and delivered torques for all future events involving the torque generation device.

In preferred embodiments, the method may further comprise receiving a feed-back input representative of the torques discrepancy Managing the torque supplied by the energy storage and recovery system to the energy source/sink may comprise activating a safety system for disabling transmission of torque from the energy storage and recovery system to the energy source/sink. Activating a safety system for disabling transmission of torque from the energy source/sink may further comprise activating one or more actuators for interrupting one or more torque transmission paths, wherein interrupting one or more torque transmission paths may optionally comprise disconnecting one or more clutches, or activating a brake. The one or more clutches may be one or more clutches of a clutched flywheel transmission. Preferably, in the case of the clutched flywheel transmission, there may be at least two engagement members in series such that one can be disconnected to disconnect drive even in the event that the other fails, such that it is locked in an engaged state.

According to a further aspect of the present disclosure, there is provided a computer programme comprising code for execution, whereby execution of said code on a computer causes the implementation of a method as described herein. A further aspect of the present invention is a computer programme product comprising said code.

In the present invention, torque transmission is monitored. Power transmitted could equally be monitored. This can be done at, or close to, the ESRS. This is advantageous at least in the safety related embodiments of the present invention, and when the energy storage and recovery system is in energy source mode (that is, the ESRS is configured for delivery of energy or power to the energy source/sink).

In at least some preferred embodiments, the torque is monitored as upstream as possible, i.e. at the source, and this provides for a maximised period of time for intervening, for example before any unwanted torque may reach the torque utilisation point, such as the vehicle wheels.

In the case of the ESRS acting in energy sink mode (that is the ESRS is configured for transfer of energy or power from the energy source/sink), similar torque monitoring strategies may be used for the safety of the ESRS, in order to prevent excess torque being transferred to the ESRS. This may prevent unexpected sudden deceleration of the vehicle, for example.

The present invention is not limited to monitoring torque transmitted in one of the two possible directions through the transmission. On the contrary, as it will be appreciated, the present invention covers embodiments where the flow of torque (or power) can be monitored in either direction.

DESCRIPTION OF THE DRAWINGS

Embodiments of the present invention will now be described, purely by way of example, with reference to the accompanying drawings, in which.

DETAILED DESCRIPTION

Figure 1:
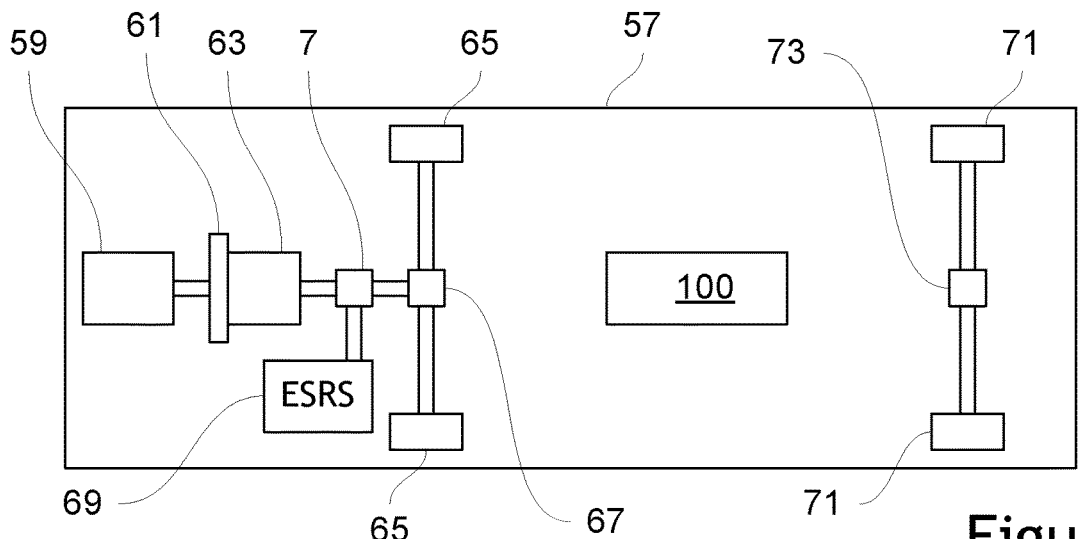
FIG. 1 shows schematically a vehicle according to an embodiment of the present invention.
Figure 2:
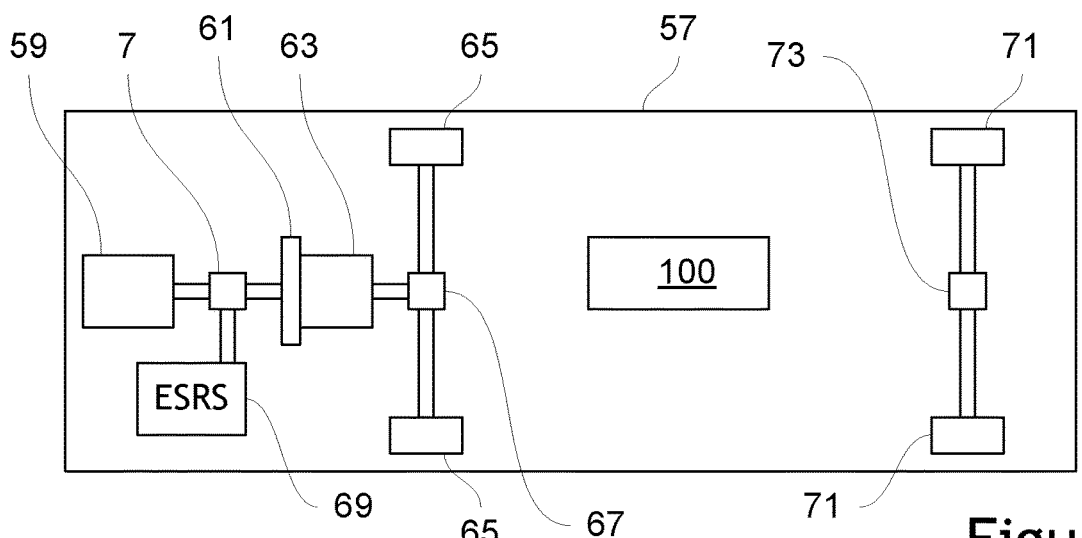
FIG. 2 shows schematically a vehicle according to another embodiment of the present invention.
Figure 3:
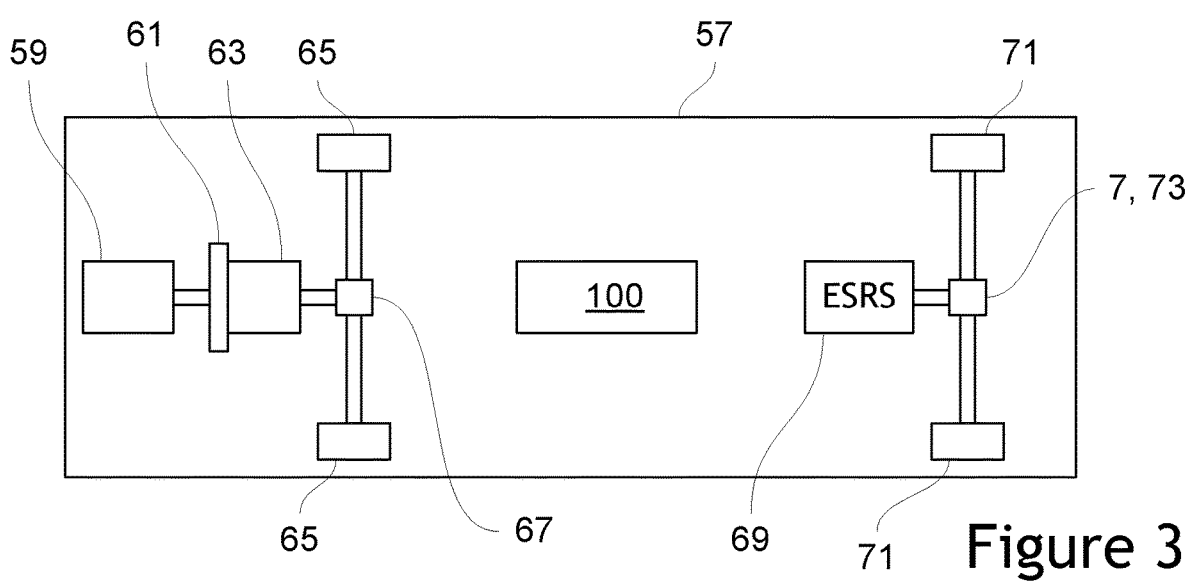
FIG. 3 shows schematically a vehicle according to yet another embodiment of the present invention.

With reference to the drawings, FIGS. 1, 2 and 3 show schematically different arrangements of an energy storage and recovery system (ESRS) 69 on board a vehicle 57. In each case, the ESRS 69 is managed by a control arrangement that includes a controller 100 according to an embodiment of the present invention. The controller manages the torque delivered by the ESRS 69 to the wheels 65, 71 of the vehicle 57 (if positive) or received by the ESRS 69 from the wheels 57 of the vehicle (if negative) such that the torque delivered or received is maintained in line with a corresponding torque request (which is also signed, respectively, positive or negative), or, if the torque supplied cannot be realigned to the torque demanded (for example in case of failure of a mechanical component involved in the control of the torque delivered), the torque controller may disable the ESRS such that it can no longer apply torque to the transmission.

In the embodiments described herein, the ERSR has a flywheel 1 for storing energy in the form of kinetic energy. However, the present invention is equally applicable to ESRS having different energy storage devices.

The controller 100 monitors the torque demand and supply by receiving, respectively, first and second inputs. The first input represents the torque demand directly, for example in the form of a voltage sent to the controller. The second input may represent the torque supply directly, again for example in the form of a voltage, or it can be such that a signal representative of the torque supply can be derived from it. For example, the second input can be a measured flywheel speed, because if the flywheel rotational speed is known at different instants in time, it is possible to derive from it a signal representative of the torque supplied by the flywheel from it, as it will be described in more detail below in connection with FIGS. 7a-d.

If discrepancy between the torque demand and supply justifies intervention, the controller 100 may take actions, such as the output of one or more appropriate signals that may cause the torque supply to align with the torque demand or the ESRS to enter a safe state whereby the ESRS no longer applies torque to the energy source/sink. Alternative actions are however possible, as it will become apparent below.

In these described embodiments, the controller outputs one or more signals and sends them to one or more actuators that change the operating pressures of one or more clutches in the active torque path. This determines a change in energy exchanged between the ESRS 69 and the vehicle 57—or, in alternative embodiments, this exchange could be between the ESRS 69 and a vehicle accessory such as a lifting arm—that tends to level or remove the discrepancy between the torque demand and supply. Examples of clutched transmissions will be described further herein.

In FIGS. 1 and 2 the flywheel 1 is connected to the system for driving the wheels 65 of the vehicle; in FIG. 3 the flywheel 1 is connected to the wheels 71 not driven by the main powertrain of the vehicle 57. As mentioned above, an alternative could be that the flywheel 1 be connected to a vehicle accessory such as an excavation arm. In any configuration, the ESRS 69 is ultimately connected to, in generalised terms, an energy source/sink 7 and, in the embodiments described herein, this connection is via a clutched flywheel transmission. However, as the skilled person will appreciate, the present invention is not limited to clutched flywheel transmissions. On the contrary, the present invention is applicable to all transmissions capable of transmitting torque between the ESRS 69 and a torque utilisation point which we have described here as the energy source/sink 7.

In FIG. 1, the vehicle 57 is powered by an engine 59, such as an internal combustion engine, which transmits drive through a clutch 61 to a gearbox 63. The gearbox imparts drive to driven wheels 65 via a differential coupling 67. In this embodiment, a drivetrain coupling 7 for the ESRS 69 is connected between the gearbox 63 and the differential coupling 67. The drivetrain coupling 7 represents the energy source/sink connected to the flywheel 1. With this arrangement, it is possible for the ESRS to apply a braking torque to the driven wheels 65 to slow down the vehicle 57, with kinetic energy of the vehicle being delivered from the driven wheels 65 through the differential coupling 67 and the drivetrain coupling 7 back to the ESRS 69, allowing it to be stored as rotation in the flywheel 1.

FIG. 2 shows an alternative arrangement, in which the drivetrain coupling 7 is connected between the engine 59 and the clutch 61 and gearbox 63 of the vehicle. This arrangement allows for the same transfer of energy and torque between the driven wheels 65 and the energy storage and recovery system 69, but the engine 59 will also be engaged during these operations. However, drive between the wheels 65 and the ESRS 69 passes through the gearbox 63 in addition to the clutched flywheel transmission, increasing the total number of transmission ratios between the wheels 65 and the flywheel 1. Additionally, the arrangement of FIG. 2 allows energy transfer between the engine 59 and the ESRS 69 while the clutch 61 is disengaged, so that there is no transmission to the wheels 65. This allows for further operations such as the use of the flywheel 1 to start the engine 59, and the use of the engine 59 to store energy into the flywheel 1 if desired while the vehicle 57 is stationary and in neutral gear.

In the arrangement of FIG. 3, the ESRS 69 is connected to the undriven wheels 71 of the vehicle 57, and the drivetrain coupling 7 is integrated into a differential coupling 73 for the undriven wheels 71. Similarly, in alternative embodiments, the ESRS 69 could be dedicated to another vehicle utility such as a lifting arm, or excavator boom or the like.

Figure 4A:
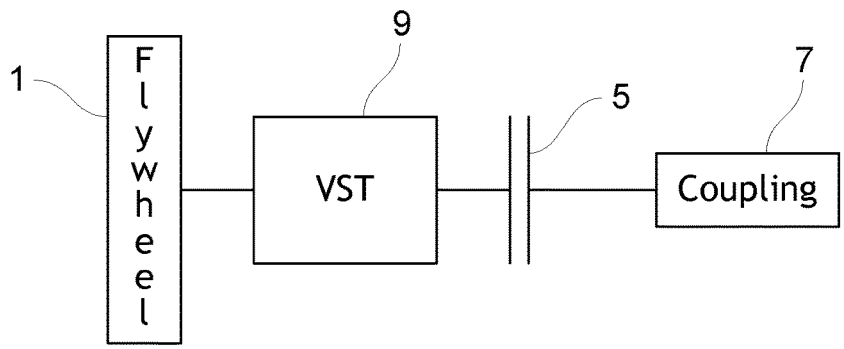
FIG. 4a shows schematically a transmission that couples a flywheel to a drivetrain coupling of one of the vehicles shown in FIGS. 1 to 3.

FIG. 4a shows schematically a clutched flywheel transmission that may be used to couple the energy storage and recovery system 69, which in these embodiments comprises a flywheel 1, to the drivetrain coupling 7, which in these embodiments represents the energy source/sink. The transmission comprises a transmission ratio adjuster in the form of a variable slip transmission (VST) 9 and a clutch 5. The variable slip transmission 9 may be as described for example in WO 2011/080512.

The clutch 5 is controlled so as to slip during operation of the transmission of FIG. 4a. The clamp force applied to the clutch 5 is controlled in accordance with the torque which it is desired to be applied to the drivetrain coupling 7 in order to extract energy from, or deliver energy to the wheels 65, 71. If the required level of torque is constant, the clamp force applied to the clutch 5 will be constant. If the required level of torque changes, the clamp force applied to the clutch 5 will change accordingly. The torque transmitted through the slipping clutch 5 is determined by the clamp force and the friction characteristics of the clutch, and is independent of the slip speed of the clutch. The clutch 5 is operated with a controlled slip, e.g. the slip speed is maintained substantially constant or is kept within a pre-set range, and the transmission ratio between the flywheel 1 and the drivetrain coupling 7 is varied by variation of the transmission ratio through the variable slip transmission 9. The slip speed of the clutch 5 is monitored and the clutch force of the active clutch (i.e. the clutch being used to transmit torque) in the VST 9 is adjusted to maintain the slip speed of the clutch 5 at the desired value or in the desired range.

Since the variable slip transmission 9 includes slipping clutches, it would be possible to control the clutch force (the clamp force applied between the plates of the clutch) so as to maintain constant torque through the clutch that is currently being used. However, it is preferred to include the clutch 5 as shown in FIG. 1, in order to isolate the drivetrain coupling 7 from torque fluctuations that may arise as the VST 9 hands over drive from one clutch to another.

The controller 100 is responsive to the torque transmitted by the clutch 5, and in particular it responds such that the torque transmitted by the clutch 5 (i.e. the torque supplied) is in line with a corresponding torque request to the flywheel 1 (torque demand) even in case of ageing or failure of mechanical components involved in controlling the transmission of torque to the energy source/sink.

Figure 4B:
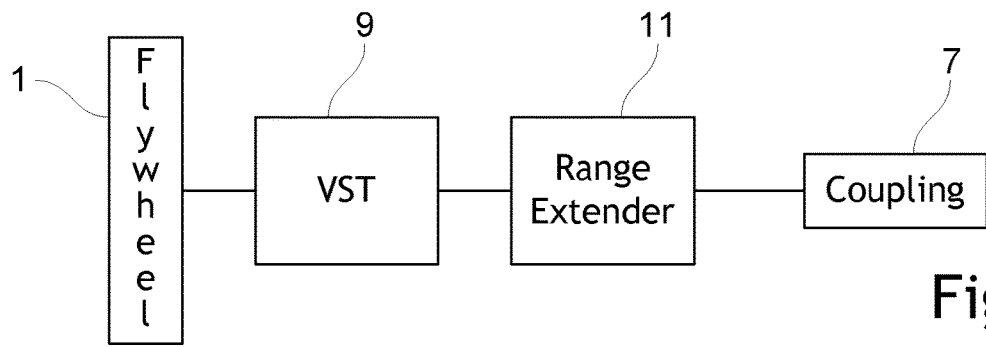
FIG. 4b shows schematically an alternative transmission arrangement.

FIG. 4b shows another transmission configuration that includes a range extender 11 between the VST of FIG. 4a and the drivetrain coupling 7. Although variable slip transmissions are advantageous because they allow a substantially continuous variation in the transmission ratio without abrupt ratio changes, they normally have an overall range of ratios from the highest transmission ratio to the lowest transmission ratio which is narrower than may often be required. The total range of transmission ratios available in the transmission as a whole can be increased by providing a second ratio adjuster (i.e. a second mechanism or device which can change the transmission ratio) in series with the VST 9, and this is referred to as a range extender 11. In some circumstances, the range extender 11 can be a simple gearbox but in the present embodiment it is an arrangement of gear paths with different transmission ratios combined with selecting clutches that may have the same mechanical construction as the variable slip transmission of WO 2011/080512. However, since substantially continuous variation of the transmission ratio is provided by the VST 9, it is not necessary to operate the range extender 11 with variable clutch slip speeds. Instead, the range extender 11 can be operated with a constant ratio while the VST 9 sweeps through its total range of transmission ratios. Then the transmission ratio of the range extender 11 is shifted.

Because the range extender 11 used in FIG. 4b has selecting clutches to enable changes in its transmission ratio, it is possible to slip the clutch in the range extender 11 for the ratio in use, and this provides a slipping clutch between the VST 9 and the drivetrain coupling 7 to isolate the drivetrain coupling 7 from the torque fluctuations at the flywheel 1, similarly to the clutch 5 of FIG. 4a. However, there may be fluctuations in the torque applied to the drivetrain coupling 7 as the range extender 11 changes ratio.

The controller 100 described herein is designed to respond to persistent rather than fluctuant misalignments between the torque demand and supply which may be caused, for example, by failure of one or more mechanical components that interact with the torque path, or by unknown causes.

Figure 5:
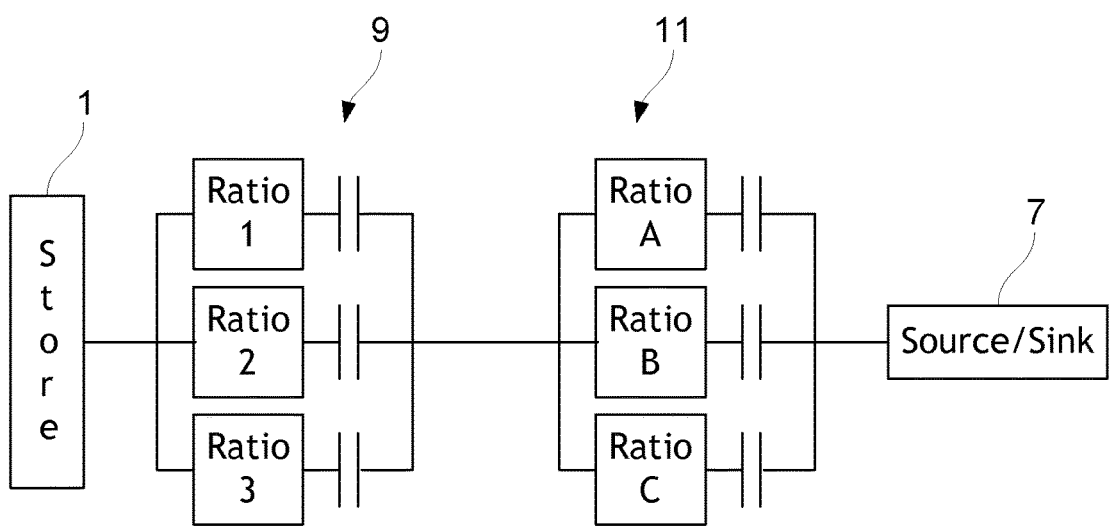
FIG. 5 shows schematically additional details of the transmission of FIG. 4b.
Figure 8:
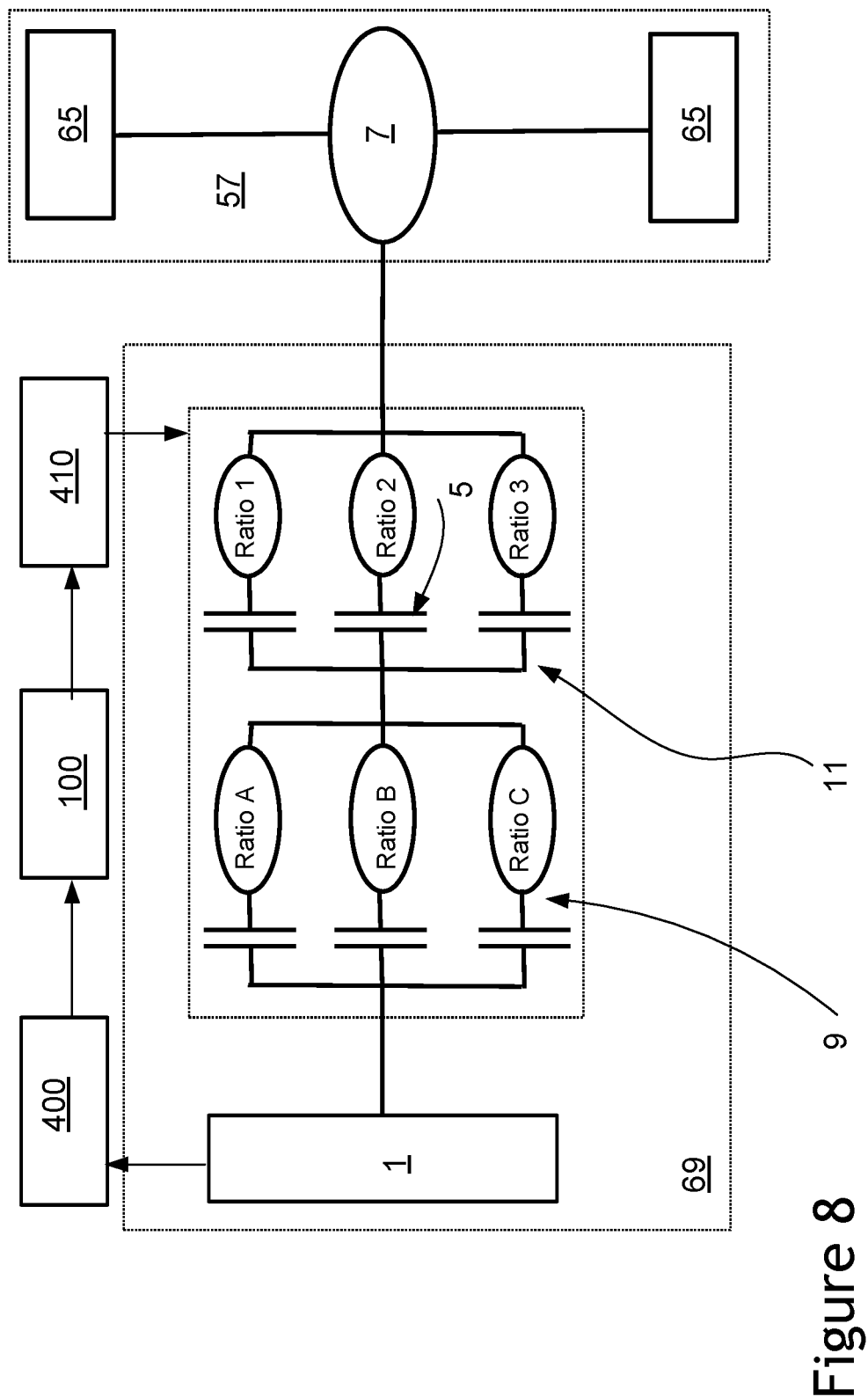
FIG. 8 shows schematically apparatus comprising a speed sensor for sending inputs to a controller according to an embodiment of the present invention.

FIG. 5 shows a "3×3" arrangement of a flywheel transmission having a variable slip transmission 9 with three parallel drive ratio paths (ratio 1; ratio 2; and ratio 3) and a range extender 11 also with three parallel drive ratio paths (ratio A; ratio B; and ratio C). FIG. 8 shows the same arrangement of FIG. 5. It is not necessary for the variable slip transmission 9 and the range extender 11 to have the same number of drive ratio paths, and a "3×2" or "2 ×3" arrangement would for example be possible. Additionally, there may be more than one range extender. For example, there may be two range extenders connected in series.

Figure 6:
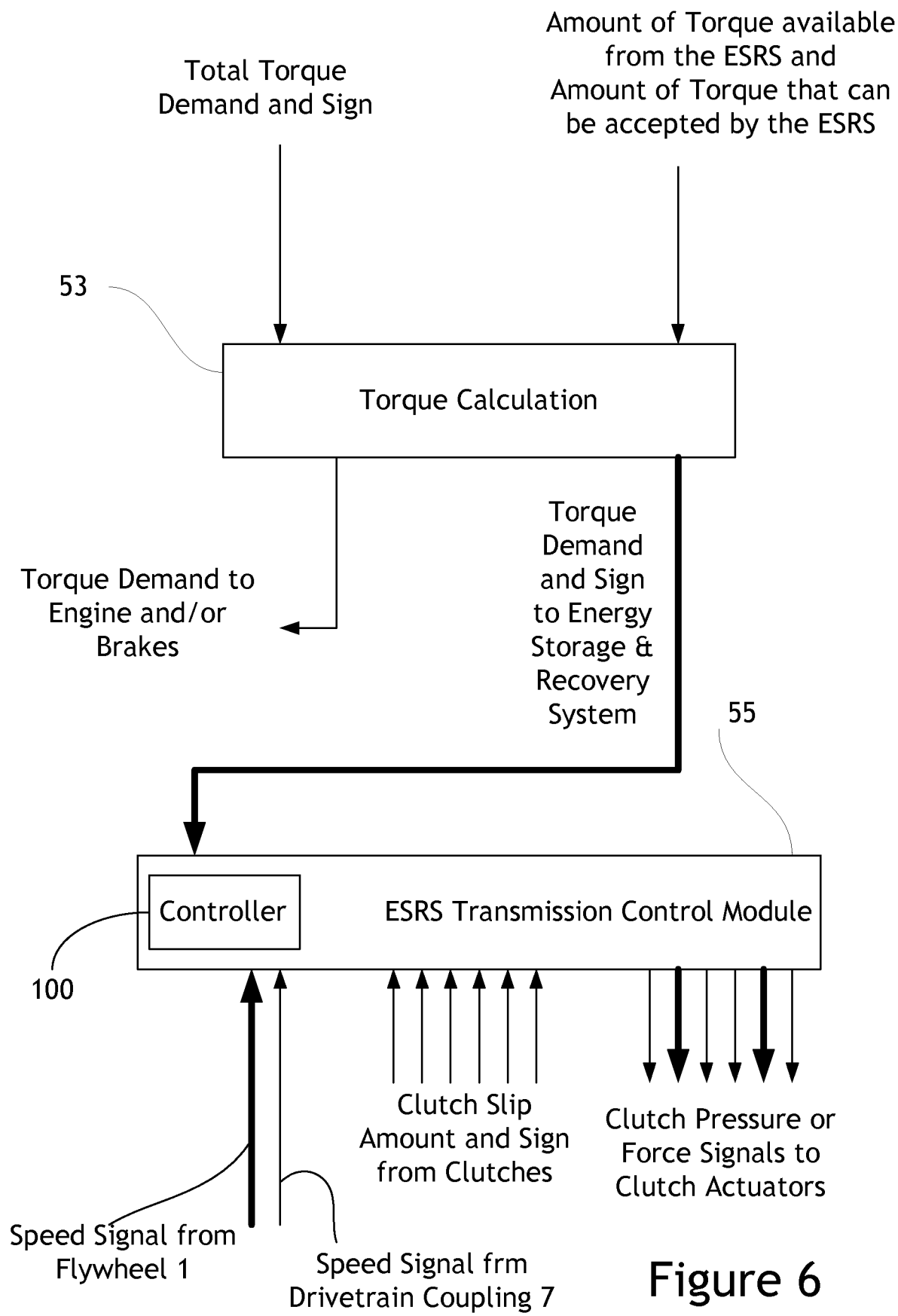
FIG. 6 illustrates a control arrangement including a controller according to an embodiment of the present invention.

FIG. 6 shows schematically the controller 100 within a general control system arrangement for controlling the energy storage and recovery system 69. As it will be appreciated, this arrangement can be implemented in software, hardware or a mixture, and may be implemented as software in a single device, such as a single programmable vehicle electronic control unit (ECU), or across a plurality of networked ECUs.

The control system receives an input indicating the total torque demanded by the overall system. The control system also receives information on the sign of the torque demand. In this example, the overall system is the vehicle powertrain, and the total torque demand may be a vehicle torque demand from the accelerator pedal, brake pedal or, for example, an automated cruise system. Alternatively, the overall system may be the drive system for raising or lowering a component such as an excavator boom or a lifting arm, or it may be the drive system for a rotating cab. The total demanded torque may be a drive torque (positive) or a braking torque (negative). The total torque demand can be satisfied by the prime mover, such as the internal combustion engine of FIG. 1, and/or the ESRS 69, as appropriate.

The total torque demand is provided to a torque calculation unit 53 which also receives an input from the ESRS 69, based on the current state of the energy storage device (the flywheel 1 in the described embodiment). This indicates the amount of torque available from the ESRS 69 (storage mode) and/or the amount of torque that can be accepted by the ESRS 69 (recovery mode). The torque calculation unit 53 determines how much of the total torque demand can be met by supplying energy to, or drawing energy from, the ESRS 69. The remainder will be met by the prime mover with or without cooperation from an alternative system such as the vehicle brakes. As a result of this calculation, the torque calculation unit 53 generates a signal indicative of a torque demand and sign for the ESRS, and sends it to an ESRS transmission control module 55 which, in this architecture, includes the functionality of the controller 100, as shown in FIG. 6. This input received by the controller 100 is shown as a bold line at the centre of FIG. 6.

The ESRS transmission control module 55 also receives a signal from each clutch in the clutched flywheel transmission indicating the direction and amount of slip of the clutch, and is able to send a signal to the actuator of each clutch indicating the required clutch pressure or clutch force (depending on the type of signal required by the actuator). Additionally, by way of feed-back control, it may optionally receive signals indicating measured clutch pressure or force. Feed-back control strategies in relation to the controller 100 will be described below in relation to the Adaptive Control Mode.

The ESRS transmission control module 55 also receives a signal inferred from one or more sensors which measure a signal representative of flywheel rotational position or motion. Typically this signal will be in the form of a pulsed signal, and these pulses will be summed over a period of time by a controller in order to determine an actual speed of the flywheel. From this, the rate of change of flywheel speed may be calculated, this enabling the torque supplied to be determined by the controller. This other input is also received by the controller 100 and is also shown in the bottom-left corner of FIG. 6.

Additionally, in this embodiment, the ESRS transmission control system 55 and the controller 100 receive one input indicative of the speed of the drivetrain coupling 7 of FIGS. 1 to 3 and one input indicative of the flywheel speed (via sensors which measure a signal representative of flywheel rotational position or motion, typically derived from a measured pulse train). These inputs allow the ESRS transmission control system 55 and the controller 100 to always be informed of the overall transfer ratio through the clutched flywheel transmission associated with the ESRS 69. The flywheel speed could be differentiated numerically, the resulting rate of change of flywheel speed enabling the torque supplied to be determined.

In response to the inputs shown in bold lines on FIG. 6 (i.e. the first input (centre right) which, in this embodiment, is indicative of the torque demand from the ESRS, and the second input which, in this embodiment, is indicative of the torque supplied by the flywheel 1), if there is sustained discrepancy between the torque supplied and demanded, in this embodiment the controller 100 outputs one or more signals (also represented in bold, at the bottom right of FIG. 6). These control signals are outputted only if certain conditions are met. The effect of these outputted signals is to change or adjust the amount of torque (or power) supplied by the ESRS 69 to align this torque with the demand, as necessary. This ensures that the torque (or power) supplied by the flywheel 1 is or is kept at all times congruous (i.e. equal or at least within a close boundary) to the torque (or power) demanded from it, as calculated by the torque calculator 53, even in unforeseen circumstances such as damage, failure or transient malfunctioning of one or more mechanical components involved in controlling the torque supplied by the ESRS.

As the skilled person will appreciate, it is not necessary for the torque demand and supply inputs to be directly representative of the underlying torques. Alternative embodiments may use related parameters which are not directly indicative of the torque demand and supply. For example, the torque demand can be converted into an equivalent flywheel speed demand, and this equivalent flywheel speed demand can at any time instant be compared with a measured or actual flywheel speed. In other embodiments, a measured or actual flywheel speed signal can be converted into torque supplied by the flywheel 1. Similarly, the methods and algorithms described herein could employ quantities indicative of energy and/or power rather than torque. For example, it is possible to consider the impact of a power transfer (rather than a torque application) to or from the energy source/sink. For example, if there is a demanded transfer of power to or from the energy source/sink, then this power may be divided by the speed of the energy source/sink, thus determining an estimated demanded torque value. This torque demand at the energy source/sink may then be referred to the flywheel as described previously, and if the flywheel acceleration and/or speed estimated as necessary. Alternatively, demanded power at the source/sink may be referred to the flywheel by subtracting power losses in the transmission, and in the flywheel assembly itself (for example due to coast down effects) in order to infer the estimated change in energy of the flywheel, this being calculated optionally from the numerical integration of the power demand referred to the flywheel. If estimated flywheel speed is required in order to make a comparison with the sensed flywheel speed, then this may be calculated from the equation of rotational kinetic energy, where:

$$\text{flywheel energy} = 0.5 * \text{rotational\_inertia} * (\text{rotational speed}^2); \text{thus}$$

$$\text{flywheel speed} = \sqrt{2 * \text{flywheel energy} / \text{rotational\_inertia}}.$$

An example of using sensed flywheel motion for the detection of undesirable torque delivery to a vehicle as a part of "Safety Monitoring System" is described with reference to FIGS. 7a-d. A clutched flywheel transmission is assumed in this example.

If the torque demand from the torque calculator 53 is zero, and zero is also the vehicle speed (i.e. the vehicle is at a stop) the ESRS transmission control module 55 ensures that all of the clutches of at least one stage in the transmission of the ESRS 69 are fully disengaged, so that the energy storage device (i.e. the flywheel 1 in this embodiment) is neither receiving nor delivering energy (this is termed the "safe state"). This scenario is further described below in the Safety Monitoring System section. The controller 100 may be programmed to cause the ESRS to enter the safe state when the torque demand is equal to zero, but also even when the torque demand is not equal to zero, if it is appropriate to do so.

If a non-zero torque demand signal is received, the ESRS transmission control module 55 determines which path through the transmission of the ESRS 69 provides the lowest total clutch slip with the correct direction of slip and calculates the correct clutch pressure(s) or force signal(s) required for the relevant clutches in order to transmit the level of torque required. These signals are transmitted to the clutch actuators for the appropriate clutches to begin transfer of energy between the energy storage device (the flywheel 1 in the described embodiment) and the drivetrain coupling 7 so as to apply the required torque. The controller 100 uses an input directly indicative of the torque supplied by the flywheel, or an input from which this information can be derived, and if sustained discrepancy is detected between the torque supplied and the torque demand which requires correction, appropriate actions are taken by the controller to manage the ESRS and therefore rectify the discrepancy, or to take alternative action if the vehicle condition is deemed to be unacceptable.

As soon as the clutch actuators engage the relevant clutches, and torque begins to be transmitted from the flywheel 1, clutch slip signals will be received from the clutches in the transmission.

The control strategy adopted by the controller 100 to rectify any discrepancies between the torque supplied and the torque demanded may be proportional, proportional-integral or proportional-integral-differential.

An application of the torque monitoring strategy of the controller 100 arises when the torque demand is zero, the vehicle is at a stop, and the controller detects an application of undesired torque by the ESRS 69. This could cause the vehicle 57 to move at a moment when it should remain at a stop. The controller adopts a Safety Monitoring System algorithm as described herein in connection with FIGS. 7a to 7d.

Safety Mode

In the Safety Mode described herein, the torque demand from the flywheel 1 is zero or below a predetermined, low threshold and the vehicle is still, for example at a junction, and is in neutral gear. The Safety Mode implemented by the controller 100 in this scenario can be considered as a damage-tolerant safety procedure, whereby if accidental torque flow instigated by unknown damage or malfunctioning of the transmission (or related control) is detected, a procedure is activated that prevents or minimises any undesired torque reaching the wheels. Movement of the vehicle in these conditions may be potentially hazardous for the passengers of the vehicle or persons nearby.

The controller 100 is implemented in the described embodiments as a programmable electronic control unit (ECU). The programmable ECU has an associated processor and a memory. In the memory, a current data buffer is provided of sufficient size ENERGY_SAMPLES to hold samples of flywheel related speed measured by a flywheel speed sensor 400 (this is shown in FIG. 8).

The torque exchanged by the flywheel 1 with the transmission 9, 5 is derived in this embodiment from the measured flywheel speed.

The current data buffer is, in this embodiment, part of a persistent data structure of the memory of the ECU. The persistent data structure always holds a copy of a previous data buffer with previously measured flywheel speed samples. The persistent data structure undergoes cyclic redundancy checks 110 carried out by the programmable ECU to confirm that it has not been corrupted, and it is therefore ready or fit for use.

Figure 7A:
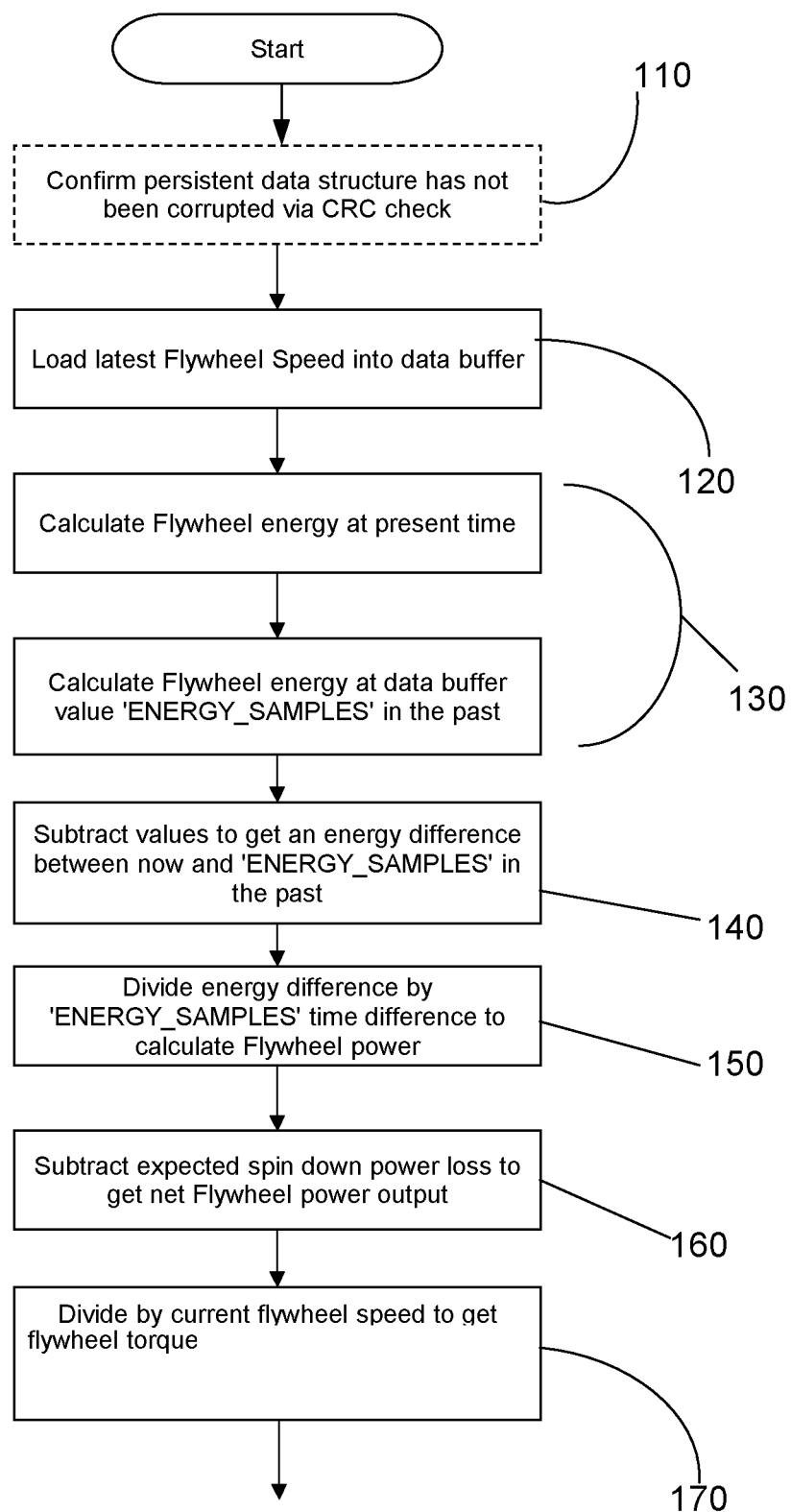
FIGS. 7a to 7d illustrate a Safety Monitoring System algorithm implemented by a controller according to an embodiment of the present invention.

As shown in FIG. 7a, the latest flywheel speed samples are loaded 120 into the current data buffer. It should be understood that these speed signals may in practice be pulse signals or pulse-trains which are converted within, or external to, the controller to provide a signal representative of flywheel speed. The programmable ECU is programmed to calculate 130 current and previous flywheel kinetic energies on the basis of the flywheel speed samples stored in the current and previous data buffers. In this embodiment, the respective flywheel kinetic energies (i.e. for the previous and current data buffers) are represented by an average flywheel speed across the available flywheel speed samples. Preferably, the kinetic energies can be calculated for each flywheel speed sample. The programmable ECU then calculates 140 a difference between those current and past energies associated with the flywheel. By dividing the energy difference by an associated time difference between the current and previous data buffers, the programmable ECU then calculates 150 a current power associated with the flywheel.

At this point, in this embodiment, the programmable ECU optionally adjusts 160 the current power associated with the flywheel to take into account a 'spin down' (or 'coast down') power loss. The spin down power loss represents the instantaneous power loss by the flywheel due to inherent losses such as windage, bearing losses, power consumption absorbed by any service pump, and optionally any losses associated with drag from adjacent transmission elements which are present even when all clutches in the transmission are disengaged. Information relating to one or more appropriate coefficients representing the spin down power loss is, in the Safety Mode, in addition provided to the programmable ECU via one or more additional inputs and/or are preferably stored within the ECU's memory (optionally permanently) or code. The spin down power loss may be a constant coefficient, or its value may depend on the type of transmission used to transmit the torque between the flywheel 1 and the wheels 65, 71. These one or more additional inputs may come from a look-up table associated with the programmable ECU. The look-up table may be stored in the programmable ECU's memory, or may be stored in a separate memory, for example pertaining to another programmable ECU that can communicate with the programmable ECU that implements the present controller 100, for example via a vehicle network.

Note, briefly, that the spin down power losses may be different to corresponding 'spin up' power losses. This is because loss of energy in energy discharge mode may not be the same as loss of energy in energy recovery mode. The controller may accordingly be programmed to take this into account.

Finally (as far as FIG. 7a shows) by dividing the current flywheel power by the current flywheel speed, the programmable ECU calculates 170 the net torque (magnitude and the sign) being transmitted at the flywheel.

As described above in relation to FIG. 7a, in this embodiment the controller 100 is programmed to derive the input representative of the torque supplied by the flywheel 1 from the measured flywheel rotational position or speed. The skilled person will appreciate that a similar procedure can be adopted if, for example, the flywheel acceleration is measured (or derived) instead of the flywheel speed. By knowing or measuring the rate of change of flywheel speed with time, and knowing the moment of inertia of the flywheel rotor, it is possible to derive the amount of power at any time exchanged by the flywheel 1 with the transmission, and, thus, the torque being supplied.

Figure 7B:
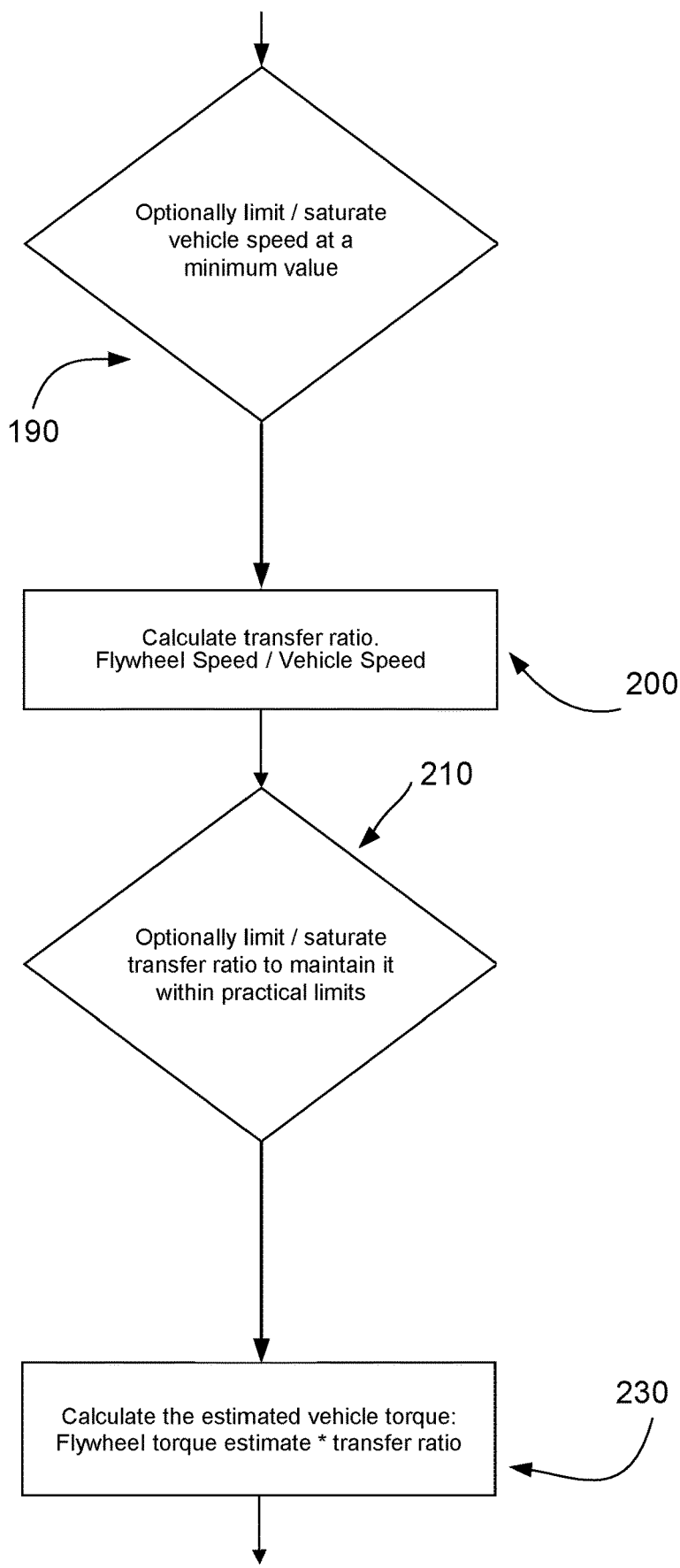

FIG. 7a shows the conversion of flywheel speed data into flywheel torque. The successive steps of the Safety Mode algorithm are shown in FIG. 7b, which shows instead how it is possible to convert the torque measured at the flywheel into torque transmitted on the vehicle side, i.e. the vehicle end of the transmission. In the described embodiments, this is the torque exchanged at the vehicle drivetrain coupling 7.

In this embodiment, it is the torque at the vehicle side that is required by the controller 100 to enable the controller to compare this value with the corresponding torque demand, so as to evaluate possible discrepancies and apply any required corrections. Note that although in this embodiment the torque at the vehicle side is taken to be the torque supplied at the drivetrain coupling 7, in alternative embodiments other reference locations upstream or downstream of the drivetrain coupling 7 could be used, as will be apparent to the skilled person.

As described above in connection with FIG. 6, the controller 100 may receive speed inputs relating to the flywheel 1 and the drivetrain coupling 7. In FIG. 7b, the controller 100 may optionally saturate the vehicle speed to a predetermined minimum value 190, and then calculate 200 a transfer ratio as the ratio between the speeds of the flywheel 1 and the vehicle speed (or drivetrain coupling 7).

Saturating the vehicle speed at a minimum value prevents the transfer ratio from being calculated as infinity when the measured vehicle speed is zero. This is important since the Safety Mode is especially beneficial when used in connection with stationary vehicles.

The controller 100 then also optionally imposes 210 a limit on the calculated transfer ratio. This accounts for practical limits, such as a limited range of transmission ratios over which the ESRS may be permitted or able to transmit power.

The controller 100 then calculates 230 the torque supplied at the vehicle side. This is calculated as the net torque supplied referred at the flywheel multiplied by the transfer ratio. The torque at the flywheel has now been converted into torque exchanged at the vehicle side of the transmission. Optionally, the vehicle side torque can be adjusted to take into account energy dissipation coefficients related to the transmission. The procedure to do so would be similar to that described above in connection with spin-down power losses, which are in addition to any intrinsic transmission losses. Note that also any transmission losses may be asymmetric for the cases of energy storage or recovery, i.e. when the torque is respectively positive or negative.

Figure 7C:
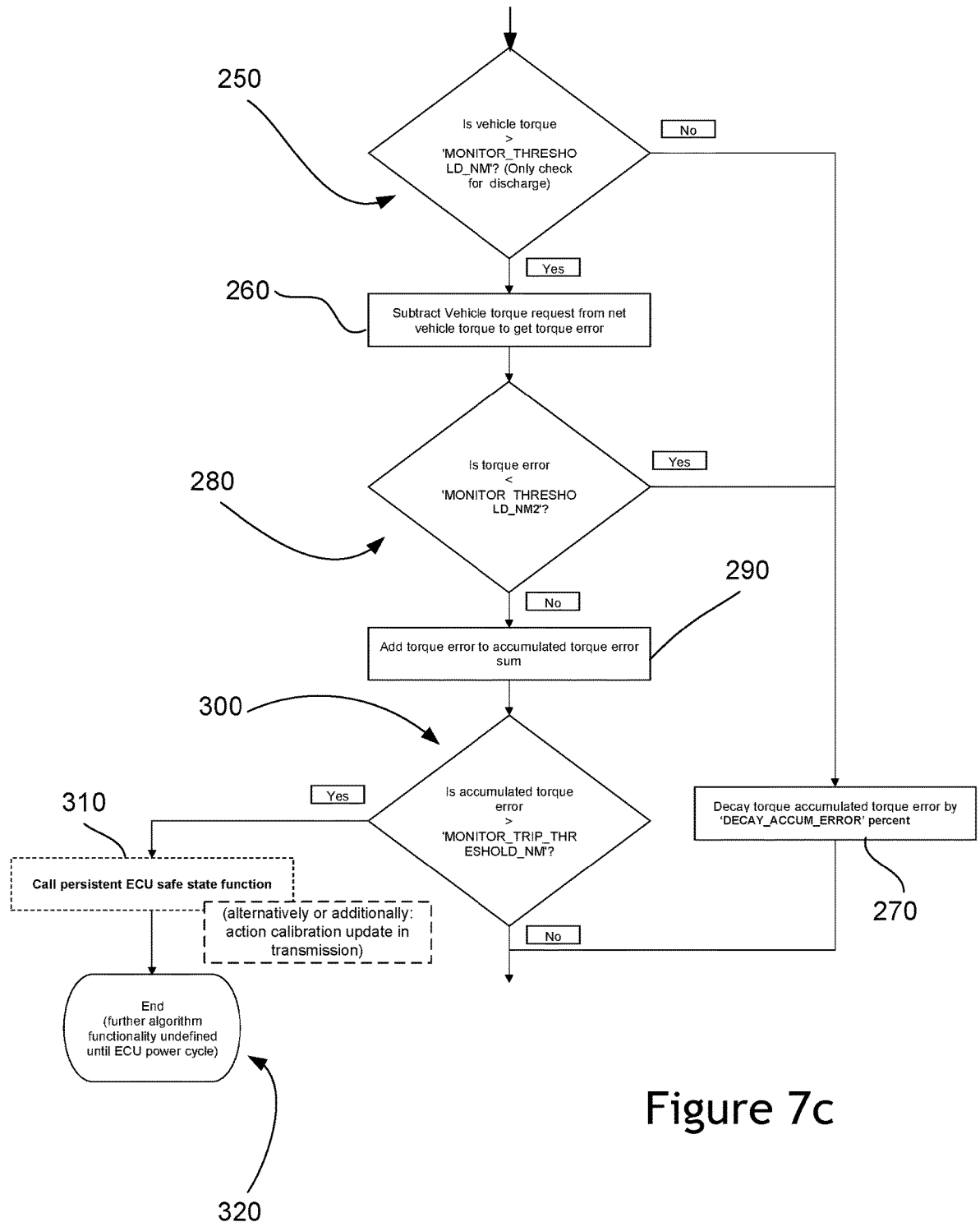

FIG. 7c illustrates a set of conditions that the controller 100 is required to satisfy prior to intervention to align the torque supply with the torque demand, or to disable torque transfer, as required. These conditions ensure that the response of the controller 100 is adequate in the Safety Mode. Different conditions may be required for different modes of operation of the controller 100.

As shown in FIG. 7c, the controller compares 250 the torque supplied at the drivetrain coupling (i.e. the torque at the vehicle side of the transmission) with a predetermined value MONITOR_THRESHOLD_NM. This predetermined value may be constant, as in the presently described embodiment, or may depend on one or more parameters. If the supplied vehicle side torque is greater than MONITOR_THRESHOLD_NM, the controller proceeds with the calculation 260 of a torque error that represents a difference between the torque supply and the torque demand. If the vehicle side torque is lower than MONITOR_THRESHOLD_NM, the error is not calculated for the present iteration, and a variable representative of an accumulated torque error sum is reduced 270 by a predetermined amount. In this embodiment, this amount is a fixed percentage of the accumulated error, DECAY_ACCUM_ERROR in FIG. 7c.

If, in addition to the condition 250 described above, the difference between the vehicle side torque supply and the corresponding torque request is also greater than a second predetermined threshold 280, labelled MONITOR_THRESHOLD_NM2 in FIG. 7c, the controller establishes that the error may have been caused by a persistent torque misalignment between demand and supply (i.e. rather than by a spurious fluctuation such as at gear change or signal noise), and is therefore added 290 to the accumulated torque error sum.

If the accumulated torque error sum is greater than 300 a third monitoring threshold (MONITOR_TRIP_THRESHOLD_NM in FIG. 7c) the controller 100 detects a persistent misalignment between the torque demand and the torque supply. This justifies the controller 100 to intervene, and the controller 100 therefore calls an ECU to enter a vehicle safe state function 310 which causes the ESRS to enter the safe state.

As mentioned above, the Safety Mode can be seen as a procedure for mitigating failure. It is therefore opportune that the time that the Safety Mode algorithm requires to detect a problem be linked with the severity of the problem—a problem of greater severity needing to be detected and acted upon sooner than a problem of smaller entity, and a problem of smaller entity being required to persist for longer than a more severe problem before being able to trigger action from the controller 100. It is possible to tune the parameters associated with the accumulated torque error sum and/or the MONITOR_TRIP_THRESHOLD_NM in order to cause a fault to be detected before any appreciable vehicle movement has occurred, in the case where the vehicle is stationary. There is a desirable maximum controller response time which ensures that this will be the case. It is possible to set MONITOR_TRIP_THRESHOLD_NM such that the controller 100 detects the fault after a time period just below the desirable time to mitigate failure in case of faults of greater severity, which accumulate the error faster. However, using the same simple accumulation of error strategy, at slower rates of error accumulation the controller 100 may intervene within time periods of the order of half of the desired time. It is possible to modify the torque error value prior to accumulation (i.e. after stage 280 in FIG. 7c) to enable the controller 100 to respond after a time more close to that which is desirable for events of lesser severity. To do so, the MONITOR_THRESHOLD_NM2 value would need to be expressed as a function of the error, so that less weight is given to errors of smaller magnitude. This may in addition minimise any risks of the controller 100 performing a false call.

The vehicle safe state function 310 may cause an actuator to apply an emergency brake, or to open one or more clutches in one or more of the possible torque transfer paths. This may cause the ESRS to enter the safe state. FIG. 8 shows schematically the means 410 for implementing the safe state function 310. However, other safety outcomes are also contemplated for the Safety Mode, or other possible modes of operation of the controller 100. Finally, the Safety Mode algorithm ends 320, and awaits re-initialisation in due course. Note that an alternative output for this routine could additionally or alternatively comprise activation of an adaptive algorithm which updates controller calibration parameters, such parameters influencing the open loop relationship between requested and supplied torque. These aspects are described in this disclosure.

If the second threshold is not satisfied, the accumulated torque error is decayed 270 as described above (i.e. if the first threshold criterion is not met). If the third threshold, i.e. the threshold pertaining to the accumulated torque error sum, is not satisfied the controller questions 330 whether the accumulated torque error sum should be reset 340 to an original value which may be zero.

Figure 7D:
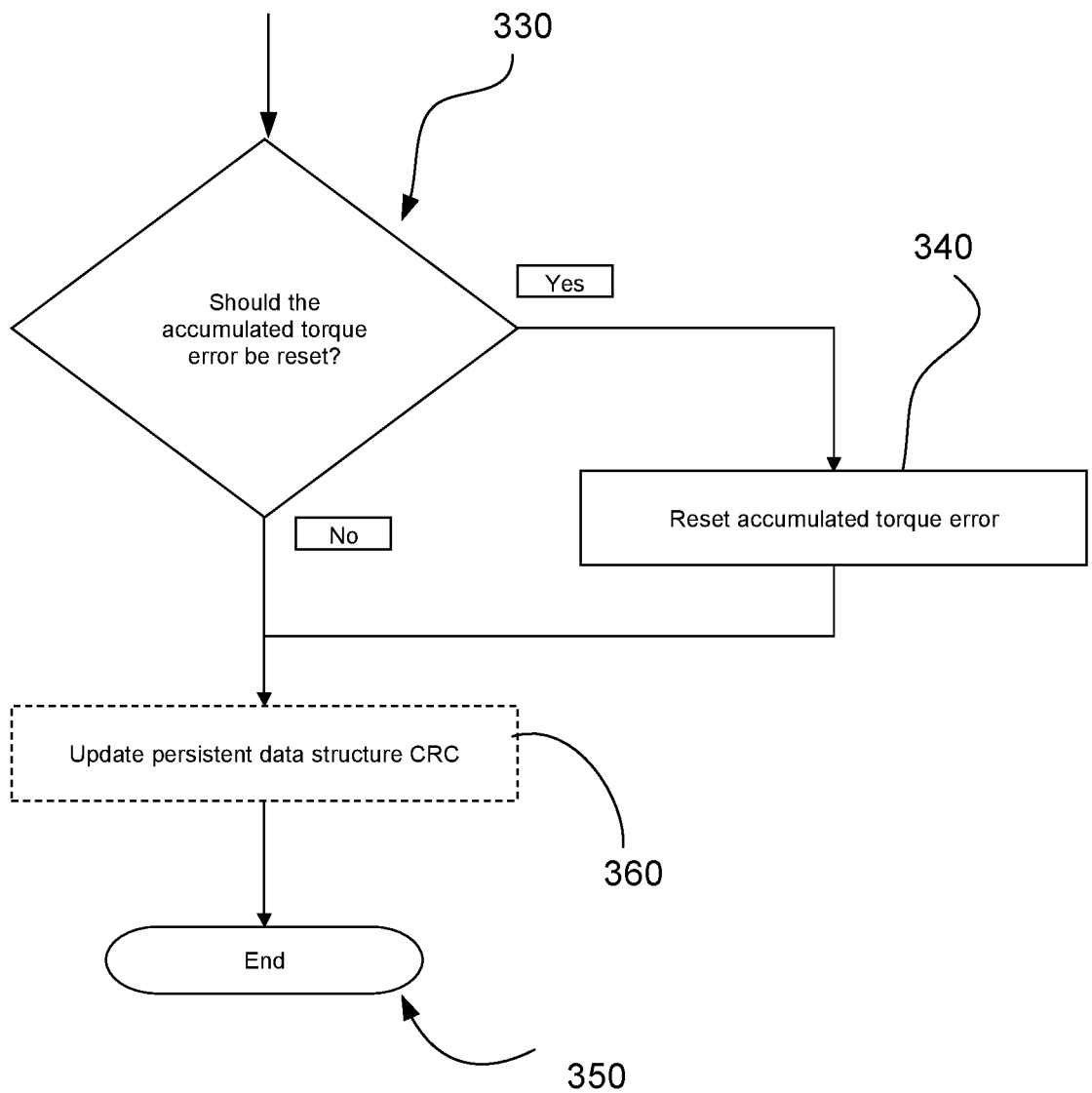

Criteria for resetting the accumulated torque error sum include low flywheel speed or energy, the absence of hydraulic pressure at one or more actuators or an indication that the ESRS is in the safe state. This phase is illustrated in FIG. 7d. Whether the accumulated torque error sum is reset or not, the current iteration of the Safety Mode algorithm now approaches its end 350 even though the safe state function 310 has not been called. The controller is now also ready to update 360 the persistent data structure in its memory with a new buffer of acquired flywheel speed samples and run a fresh cyclic redundancy check. This algorithm may typically be repeated at successive and regular time steps.

Adaptive Control Mode

The Adaptive Control Mode is essentially the same as the Safety Mode insofar as the determination of a torque error is concerned. In Adaptive Control Mode, however, the controller 100 is programmed to undertake a different sets of measures responsive to a misalignment between the torque demand and supply.

In a feed-forward implementation of the Adaptive Control Mode, the controller 100 may be programmed to build and in time, when necessary, or to modify for example by way of updating a calibration curve that links the torque demand to the actual torque supply. The actual torque supply, as mentioned above, can depend on factors such as vehicle ageing etc. The controller 100, therefore, may be programmed to respond to the torque demand by applying additional or subtractive torques to bring the actual torque supply in line with the torque request.

In a feed-back implementation of the Adaptive Control Mode (where one or more of the controller's output parameters, any other parameters related to them, or sensed parameters from the ESRS, are fed back as inputs to the controller 100) the controller 100 may be programmed to respond in 'real time' to a systematic or spurious mismatch between the torque demand and the actual torque supply. This may be due, for example, to a temporary malfunctioning of one or more clutch actuators, or a hydraulic or pneumatic system connected thereto. Alternatively, this could be a means of improving the torque response time of the system. The controller 100, therefore, may likewise be programmed to respond to the torque demand (and, in these embodiments, to the feed-back input) by applying additional or subtractive torques to bring the actual torque supply in line with the torque request. Preferably the feedback signal is based on the sensed flywheel motion, from which a torque referred to the flywheel, and hence to the energy source/sink, may be derived. Comparison with the torque demanded may yield a torque error on which the controller may act. This error may be passed through a Proportional (P), Integral (I), Derivative (D), or any combination of these such as PI or PID algorithms.

FIG. 8 shows schematically apparatus comprising a controller 100 as described herein. The controller receives one or more inputs from one or more sensors 400. These sensor can sense the flywheel rotation, such as in the case of position, pulse, speed or acceleration sensors. Alternatively, the sensors (for example torque meters) can sense the torque exchanged at the flywheel 1 directly, or at another location on the flywheel transmission 9, 11. From such signals, the controller 100 derives the flywheel torque which it may refer to the drivetrain coupling 7, the vehicle wheels 65 or other positions in the system as required. The controller, in this embodiment, outputs one or more signals to a means 410 for managing the torque supplied by the ESRS 69 to the wheels 65, 71 of the vehicle via the drivetrain coupling 7 in response to torque demand and supply inputs. The controller 100 thus ensures that the torque exchanged by the flywheel 1, whether positive or negative, is aligned with any torque demand addressed to the ESRS 69. The means 410 for managing the torque supplied may be a vehicle ECU different from the vehicle ECU that embodies the transmission control 55 or the controller 100 described herein.

Preferred embodiments of the controller 100 have been described herein in connection with the sections above titled Safety Mode and Adaptive Control Mode. However, the embodiments described above are given by way of non-limiting examples, and further alternatives will be apparent to those skilled in the art.

Further embodiments of the present invention are described below:

Instantaneous Energy Method

The measured energy stored in the energy storage device may be compared with the estimated storage device energy in order to detect a discrepancy, which may be indicative of a fault or inaccuracy in the delivery of torque or power to or from the energy source/sink. The delivery of torque or power to or from the energy source/sink may cause the energy storage device energy or state of charge to change. This change may be predicted from the torque or power demanded from the ESRS, for example such as the torque or power demanded from the ESRS as referred at the energy source/sink.

In the following description, reference is made to a flywheel based energy storage device. However, it should be understood that the controller and methods relating thereto are equally applicable to other energy storage devices such as hydraulic accumulators and electrical capacitors. The terms energy level, state of charge are understood to comprise similar types of quantity.

Demanding a torque (or power) at the energy source/sink will typically give rise to an expected rate of change of energy of the energy storage device. Where the energy storage device is a flywheel, a measured signal which (i) directly indicates the state of charge, or (ii) from which the state of charge may be inferred, may include a flywheel rotational position, or more preferably, speed. This may be sensed by measuring a pulse train from teeth, reflective strips on a flywheel or similar indicators of rotational position.

When comparing the demanded torque to the state of charge (which in this case is indicated by flywheel speed) the demanded torque or a signal closely related to demanded torque (for example, the demanded torque corrected for transmission ratios and transmission efficiency characteristics) referred to the flywheel may be divided by flywheel inertia to arrive at an estimated flywheel acceleration.

The measured energy storage device state of charge (indicated by speed in the case of the flywheel) may be differentiated and optionally filtered (for example using a low pass filter) in order to produce an estimate of the rate of change of state of charge (for example, indicated by the acceleration of the flywheel).

The measured rate of change of state of charge may be compared with the expected rate of change of state of charge inferred from the demanded torque to arrive at a discrepancy on which the controller may act.

Alternatively, knowledge of the torque (or power) demanded will give rise to a change of energy of the energy storage device. Where the energy storage device is a flywheel, a measured signal which (i) directly indicates the state of charge, or (ii) from which the state of charge may be inferred, may include a flywheel rotational position, or more preferably, speed.

When comparing the demanded torque to the state of charge (for example, indicated by flywheel speed) the demanded torque or a signal closely related to demanded torque (for example, the demanded torque corrected for transmission ratios and transmission efficiency characteristics) may be used by an internal model within the controller (e.g. a series of coefficients or parameters stored in a controller's memory) to predict an estimated instantaneous flywheel speed. Such an estimate may be generated by dividing said torque demanded (referred to the flywheel) by the flywheel inertia to arrive at an estimated flywheel acceleration, and integrating this within the controller internal model to arrive at an estimated instantaneous flywheel speed. The measured energy storage device state of charge (indicated by sensed speed in the case of a flywheel) need not then be differentiated because a measure of acceleration may not be required using this method; optionally the measured speed may however be filtered, for example using a low pass filter.

The measured state of charge may be compared with the expected state of charge estimated in the controller internal model to arrive at a discrepancy on which the controller may act.

A further challenge exists in that the demanded torque may be slightly different to that achieved in practice due to real-world effects such as actuator hysteresis and response delays so that, over time, the estimated flywheel speed signal estimated by taking into account the controller internal model may become different from the measured flywheel speed signal, even in the absence of any system fault or degradation. This may be solved by continuously correcting the estimated flywheel speed signal in the internal controller model using the measured flywheel speed signal, as the following text describes.

Within the internal controller model of the ESRS, the measured flywheel speed may be passed through a low-pass filter such that at a low rate of change, or at a low frequency, this signal passes through the filter substantially unchanged, optionally with unity gain. At a relatively high frequency, however, the measured flywheel speed signal is attenuated so that the signal leaving the low-pass filter is substantially reduced, or negligible. The estimated flywheel speed signal which is inferred from the demanded torque as described previously may be fed through a high-pass filter such that at a high rate of change, or at a high frequency, this signal passes through the filter substantially unchanged, optionally with unity gain. At a relatively low frequency, however, the signal is attenuated so that the signal leaving the high-pass filter is substantially reduced, or negligible. Summing these two filtered signals together provides a modified estimated flywheel speed signal which may track the actual or measured flywheel speed over a longer period of time, but which over a shorter timeframe reflects the torque demanded. This modified estimated flywheel speed signal may be compared with the measured flywheel speed signal, and any discrepancies between the two may be acted upon by the controller. This method has the advantage that the requirement for direct numerical differentiation is reduced or eliminated, so that problems of noise (in signals) and thus additional requirements for filtration (which cause delays in the response of the controller) may be avoided.

Feedback (Closed Loop) Control

The state of charge of the energy storage device, such as is indicated by the speed of a flywheel, may serve as a feedback signal from which the controller may perform closed loop control of the power which is transferred to or from (or torque applied to) the energy source/sink. More particularly the rate of change of state of charge of the energy storage device may serve as a measure of the power or torque actually delivered. If there is a discrepancy between the measured rate of change of state of charge signal of the energy storage device and the estimated rate of change of state of charge signal (inferred from the power or torque demanded at the energy source/sink) then the controller may interpret this discrepancy as an error in the torque or power delivered. This error may be fed through a controller, such as proportional ("P"), Integral ("I"), Differential ("D") or a combination of these transfer functions, such as a "P+I" or "PID" controller, in order to produce a signal from which a command representative of an effort to be applied to an actuator of a torque transfer device in the energy storage and recovery system may be derived. Likewise, the state of charge or energy level of the energy storage device (rather than the rate of change of energy or state of charge) may be employed as the control metric, with these energy levels being determined using the aforementioned methods. Accordingly, the error between the measured/sensed and estimated energy would then be fed through a closed loop control algorithm, as described previously.

Such a closed loop (feed-back) control algorithm may be used alone or more preferably in conjunction with a feed-forward control algorithm in which the controller outputs a signal which directly or indirectly controls one or more actuators of a torque transfer device. Such a signal may be related to a nominal expected torque or power to be transferred by a calibration. Such a calibration may comprise a look-up table, a map, or a coefficient or multiplier, each of which may comprise one or more calibration parameters. Incorporation of the aforementioned feedback algorithm with this feedforward algorithm can enhance the accuracy of the system, for example by improving driveability of a vehicle. The system may also be more tolerant to variability in production components, and in-service degradation of parts in the energy storage and recovery system.

Accounting for Flywheel Losses/Transmission Ratios/Energy Storage Device Discharge (Coast-Down)

In all controller algorithms and methods described herein, the torque or power demanded may preferably be referred at the energy storage device and then the state of charge (or rate of state of charge) can be estimated. The following description provides examples of how this is achieved in the context of a flywheel energy storage device which is coupled to an energy source/sink via a mechanical transmission, but these methods and control algorithms may also be applied to other energy storage and recovery systems.

The mechanical transmission may comprise a set of clutches adapted to slip for the transfer of power (or torque) between the energy storage device and the energy source/sink. Each clutch may have in series with it a gear ratio which is different from another gear ratio or ratios associated with each of the other clutches of the set. The clutches may be in parallel with each other such that slipping each clutch in sequence, and handing over smoothly the torque transfer from one clutch to the next, may emulate the function of a CVT. Such a transmission may be termed a 'clutched flywheel transmission'.

Let us consider one clutch that is slipping, applying equal and opposite torques to the flywheel and energy source/sink respectively. The energy source/sink may respond by accelerating if it behaves substantially as an inertia (such as a vehicle inertia), whilst the flywheel may accordingly decelerate as it gives up energy to the energy source/sink. However, the rate of energy decrease in the flywheel resulting from its diminishing speed (state of charge) does not all reach the energy source/sink, since some of the energy is lost due to slippage of the clutch, being dissipated as heat energy. The torque applied to the energy source sink may be estimated—in this case it may be proportional to the actuator effort (which in this case may be a force applied by a hydraulic piston) which applies a normal force to the clutch. In this example, the pressure in the actuator piston may be controlled by a pressure control valve which itself is controlled by an electrical current, Pulse Width Modulated (PWM) signal and/or by a voltage.

Having estimated the clutch torque, the controller may assume that the same torque is applied to the energy source/sink and the flywheel, albeit each torque will be in an opposite sense to the other. The slip across the clutch will typically decrease as the flywheel speed and/or vehicle speed changes, and the power loss in the clutch will also change. This method of using a variable representative of clutch torque as a control variable within the controller therefore accounts for energy losses in the clutch when referring the power or torque demanded at the energy source/sink to that which is expected to be transferred from the flywheel. This means that a more accurate estimate of expected flywheel speed or rate of change of speed may be made, compared to the result if all of the energy transferred to or from the energy source/sink were to be assumed to be also transferred at the flywheel.

Alternatively or additionally, maps describing losses in the transmission as a function of torque or speed, and/or efficiency coefficients which decrease the torque transferred by a margin or factor (particularly in systems which comprise gears which exhibit a torque, rather than a speed, power loss) may be incorporated into the controller.

Furthermore, the torque referred to the flywheel may be estimated by also considering the mechanical advantage or gearing between the energy source/sink and the flywheel, as is known in the art.

Further still, the torque referred to the flywheel may be decreased by a torque (or power) loss in the flywheel assembly itself which arises from one or more of flywheel and bearing friction, windage, other rotational losses and/or service pump power consumption. Such losses may be a function of flywheel speed, and may simply be subtracted from the torque referred to the flywheel to arrive at a net torque which causes the flywheel speed (state of charge) to change. Thus the expected flywheel speed or acceleration may be estimated more accurately than if the gearing in the transmission and/or the losses in the system were not considered.

Adaptive (Calibration/Feed-Forward) Control

The controller may output a signal which directly or indirectly controls one or more actuators of a torque transfer device in the transmission. Such a signal may be related to the nominal expected torque or power to be transferred by a calibration. Such a calibration may comprise a look-up table, a map, or a coefficient or multiplier, each of which may comprise one or more calibration parameters. Such a calibration may relate a torque demand to an actuator command. The actuator may comprise a valve in which case the calibration may comprise the relationship between a demanded torque and (i) a control valve current, (ii) a valve PWM or (iii) a valve voltage, or (iv) a valve pressure. The actuator may apply a normal load to a clutch, and may comprise a piston. The actuator may control the torque or power transferred by a torque transfer device such as a slipping clutch or a CVT.

The sensing of delivered torque or power (or the presence of a discrepancy between demanded, and actual or measured/sensed torque or power) using any of the aforementioned methods may also allow a medium or long term adjustment to be made in the parameters which influence the calibration between torque demanded and a command or signal issued to an actuator which serves to control, apply or generate the applied torque or transferred power to or from the energy source/sink.

For example, if a discrepancy in torque is inferred such that the torque delivered is lower than that expected, then the calibration may be adjusted such that the feed-forward signal issued to the actuator of the torque transfer device is increased for a given torque or power demand. Thus issuing a future similar demand for torque or power will give rise to a greater delivered torque or power which should be closer to that expected and demanded.

Advantageously, the necessity for more complex closed loop algorithms is reduced or eliminated. Furthermore, variation in the performance of the torque transfer device due to degradation (for example, clutch wear or worn control valves) is accommodated automatically without the need for manual re-calibration.

It may be preferable for this type of adaptive control algorithm to selectively determine which events the controller responds to, and therefore which events result in the controller instigating a change to the parameters which influence the calibration of the transmission. For example, it may be preferable to only increment one or more calibration parameters when the magnitude of torque or power demand is above a threshold.

Alternatively or additionally it may be preferable to only increment one or more calibration parameters when the rate of change of torque or power demand is below a threshold, or when a quasi-steady state torque is demanded.

Alternatively or additionally it may be preferable to only increment one or more calibration parameters when the duration for which torque or power is demanded exceeds a threshold.

The magnitude of the increment made to one or more calibration parameters may be determined according to these three and other criteria, optionally with the use of weighting factors applied according the degree to which the criteria have been met.

The present disclosure intends to cover analogic as well as digital controllers such as programmable controllers.

In the present disclosure, the controller being "adapted to" means that the controller is in any way arranged, configured or programmed, as the case may be, to carry out the specified functionality.

The controller may be provided by a single, physically distinguishable controller or a cluster of individually identifiable controllers such as networked controllers. However, the controller may also be provided as a distributed network, and the distributed network may be dynamically reconfigurable.

Furthermore, a controller as described herein may also be implemented by one or more sub-components (hardware or software) of a single controller.

The invention claimed is:

1. A controller for managing an energy storage and recovery system comprising an energy storage flywheel and a transmission, capable of applying torque or transferring power between the flywheel and an energy source/sink, wherein the controller is arranged:
   to receive a first input representative of a torque or power demanded from the energy storage and recovery system, or to receive a first signal from which the controller calculates said first input;
   to receive a second signal, representative of motion, speed, or acceleration of the flywheel, from which the controller calculates a second input that is representative of a torque or power supplied by the energy storage and recovery system; and
   to manage torque applied by the energy storage and recovery system to the energy source/sink or to manage power transferred between the energy storage and recovery system and the energy source/sink in response to discrepancy between the torque or power demanded and the torque or power supplied.

2. A controller according to claim 1 wherein the transmission comprises a torque transfer device and wherein the controller is arranged to manage the torque applied or power transferred by issuing a command, based on the first input, to an actuator to cause the torque transfer device to apply torque or transfer power to the energy source/sink; and
   the controller is arranged to respond to the said discrepancy under predetermined circumstances by updating at least one parameter that relates the first input to the said command.

3. A controller according to claim 1 wherein the controller is arranged to manage the torque applied or power transferred by outputting at least one signal for activating a safety system for reducing or disabling transmission of torque or power between the energy storage device and the energy source/sink.

4. A controller according to claim 3, wherein activating a safety system for reducing or disabling transmission of torque or power between the energy storage device and the energy source/sink comprises interrupting one or more torque transmission path.

5. A controller according to claim 1 wherein the controller is arranged to manage the torque applied or power transferred if one or more error conditions associated with the discrepancy are satisfied.

6. A controller according to claim 1 wherein the controller is arranged to manage the torque applied or power transferred in response to a cumulative error indicative of frequency and/or magnitude of discrepancies over a period of time.

7. A controller according to claim 6, wherein the controller is arranged to calculate the cumulative error from a summation of the discrepancies.

8. A controller according to claim 6, wherein the controller is arranged to diminish the cumulative error with time.

9. Apparatus comprising a controller according to claim 1, an energy storage and recovery system comprising an energy storage device and a transmission for applying torque to the energy source/sink or for transferring power between the energy storage device and the energy source/sink.

10. Apparatus according to claim 9 further comprising a safety system for disabling application of torque to the energy source/sink or transmission of power torque between the energy storage device and the energy source/sink, wherein the controller is arranged to output at least one signal for activating said safety system.

11. Apparatus according to claim 10, wherein said safety system comprises at least one torque path disconnection clutch and/or a safety brake.

12. A controller according to claim 1 in which the controller is arranged to obtain a signal representative of an estimate of a demanded flywheel rotational speed, energy or acceleration from the first input or the first signal, to obtain a signal representative of the actual flywheel rotational speed, energy or acceleration from the second signal, and to manage the said torque applied or the said power transferred in response to the discrepancy between the demanded flywheel rotational speed, energy or acceleration and the actual flywheel rotational speed, energy or acceleration.

13. A controller according to claim 12 wherein the controller is arranged:
   to pass the second signal, or a signal representative of the actual flywheel rotational speed obtained from the second signal, through a low-pass filter to create a filtered supply signal;
   to pass the signal representative of an estimate of a demanded flywheel rotational speed through a high pass filter to create a filtered demand signal;
   to combine or sum the filtered demand signal with the filtered supply signal to create a further signal; and
   to estimate the discrepancy by comparing the further signal with the second input or signal, or with a signal derived from the second signal.

14. A controller according to claim 13, wherein when the controller creates the signal representative of an estimated flywheel rotation or speed, the controller is adapted to take into account of torque or power loss from a standing power discharge characteristic of the energy storage device; and/or torque or power loss of the transmission; and/or from an inertial acceleration torque or power of at least one component located between the energy source/sink and energy storage device.

15. A controller according to claim 12 in which the controller is arranged to manage the said torque applied or the said power transferred in response to transient discrepancies between the demanded flywheel rotational speed, and the actual flywheel rotational speed, and alters the demanded flywheel rotational speed to correspond to the actual flywheel rotational speed in response to non-transient discrepancies.

16. A method of managing an energy storage and recovery system capable of exchanging torque or transferring power with an energy source/sink, the method comprising:
   receiving a first input representative of a torque or power demanded from the energy storage and recovery system, or receiving a first signal from which said first input can be derived;
   receiving a second signal, representative of motion, speed or acceleration of the flywheel, from which a second input that is representative of a torque or power supplied by the energy storage and recovery system can be derived;

managing torque applied by the energy storage and recovery system to the energy source/sink or power transferred between the energy storage and recovery system and the energy source/sink in response to discrepancy between the torque or power demanded and supplied.

17. A method according to claim 16, wherein managing the torque applied or power transferred comprises updating a calibration table and/or calibration software that associates a discrete or continuous range of torque or power supplies to corresponding torque or power demands to reduce or eliminate said discrepancy; wherein said calibration table and/or software preferably comprises one or more calibration coefficients and/or calibration functions.

18. A method according to claim 16, wherein managing the torque applied or power transferred comprises outputting at least one signal for activating a safety system for reducing or disabling application of torque or transmission of power from the energy storage device to the energy source/sink.

19. A method according to claim 18, wherein activating a safety system for reducing or disabling application of torque or transmission of power comprises interrupting one or more torque transmission paths.

20. A computer program for carrying out a method in accordance with claim 16.

* * * * *